United States Patent
Bloor et al.

(10) Patent No.: US 10,295,687 B2
(45) Date of Patent: May 21, 2019

(54) ATTENUATION OF MULTIPLE REFLECTIONS

(71) Applicant: Schlumberger Technology Corporation, Sugar Land, TX (US)

(72) Inventors: Robert Bloor, Missouri City, TX (US); William Goodell Sanger, Houston, TX (US); Ian Moore, Queenstown (NZ)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 106 days.

(21) Appl. No.: 15/252,172

(22) Filed: Aug. 30, 2016

(65) Prior Publication Data

US 2018/0059277 A1  Mar. 1, 2018

(51) Int. Cl.
*G01V 1/28* (2006.01)
*G01V 1/36* (2006.01)

(52) U.S. Cl.
CPC .............. *G01V 1/362* (2013.01); *G01V 1/282* (2013.01); *G01V 1/364* (2013.01); *G01V 2210/512* (2013.01); *G01V 2210/52* (2013.01); *G01V 2210/56* (2013.01); *G01V 2210/57* (2013.01); *G01V 2210/74* (2013.01)

(58) Field of Classification Search
CPC ............ G01V 1/282; G01V 1/36; G01V 1/38
See application file for complete search history.

(56) References Cited

U.S. PATENT DOCUMENTS

| | | | | |
|---|---|---|---|---|
| 5,835,883 A | * | 11/1998 | Neff | G01V 1/306 |
| | | | | 702/7 |
| 6,735,527 B1 | * | 5/2004 | Levin | G01V 1/36 |
| | | | | 702/14 |
| 7,796,467 B2 | | 9/2010 | Bisley et al. | |
| 2003/0220744 A1 | | 11/2003 | Schonewille | |
| 2005/0065758 A1 | * | 3/2005 | Moore | G01V 1/38 |
| | | | | 703/10 |
| 2005/0114032 A1 | * | 5/2005 | Wang | G01V 1/28 |
| | | | | 702/14 |
| 2008/0043573 A1 | * | 2/2008 | Bisley | G01V 1/28 |
| | | | | 367/24 |
| 2009/0048784 A1 | | 2/2009 | Matson et al. | |
| 2010/0088082 A1 | * | 4/2010 | Ingham | E21B 41/00 |
| | | | | 703/10 |

(Continued)

FOREIGN PATENT DOCUMENTS

WO  2004/061482 A1  7/2004

OTHER PUBLICATIONS

Schlumberger, Mar. 2015, Omega Geophysical Data Processing Platform Brochure (20 pages).

(Continued)

*Primary Examiner* — Michael J Dalbo
(74) *Attorney, Agent, or Firm* — Michael Guthrie

(57) ABSTRACT

A method can include selecting a location associated with a seismic survey geometry; selecting a trace for the location where the trace is selected from one of a plurality of different types of traces that include real data traces, interpolated data traces and model data traces; generating a multiple model based at least in part on the selected trace; and adjusting seismic data based at least in part on the multiple model.

20 Claims, 22 Drawing Sheets

(56) References Cited

U.S. PATENT DOCUMENTS

| | | | | |
|---|---|---|---|---|
| 2010/0161232 A1* | 6/2010 | Chen | .................... | G01V 1/345 |
| | | | | 702/16 |
| 2014/0241124 A1* | 8/2014 | Bloor | .................... | G01V 1/38 |
| | | | | 367/24 |
| 2014/0288838 A1* | 9/2014 | Trickett | ................ | G01V 1/307 |
| | | | | 702/14 |
| 2014/0343859 A1* | 11/2014 | Willis | .................... | G01V 1/308 |
| | | | | 702/14 |
| 2015/0032379 A1* | 1/2015 | Campbell | ................ | G01V 1/42 |
| | | | | 702/14 |
| 2015/0073715 A1* | 3/2015 | Aarre | .................... | G01V 1/003 |
| | | | | 702/14 |
| 2017/0059730 A1* | 3/2017 | Lu | ........................ | G01V 1/364 |

OTHER PUBLICATIONS

Schlumberger, Jan. 2013, Omega Seismic Processing System Brochure (8 pages).

International Search Report and Written Opinion for the equivalent International patent application PCT/US2017/049234 dated Dec. 11, 2017.

International Preliminary Report on Patentability Issued in the related PCT Appiication PCT/US2017/049234 dated Mar. 14, 2919 (14 pages).

* cited by examiner

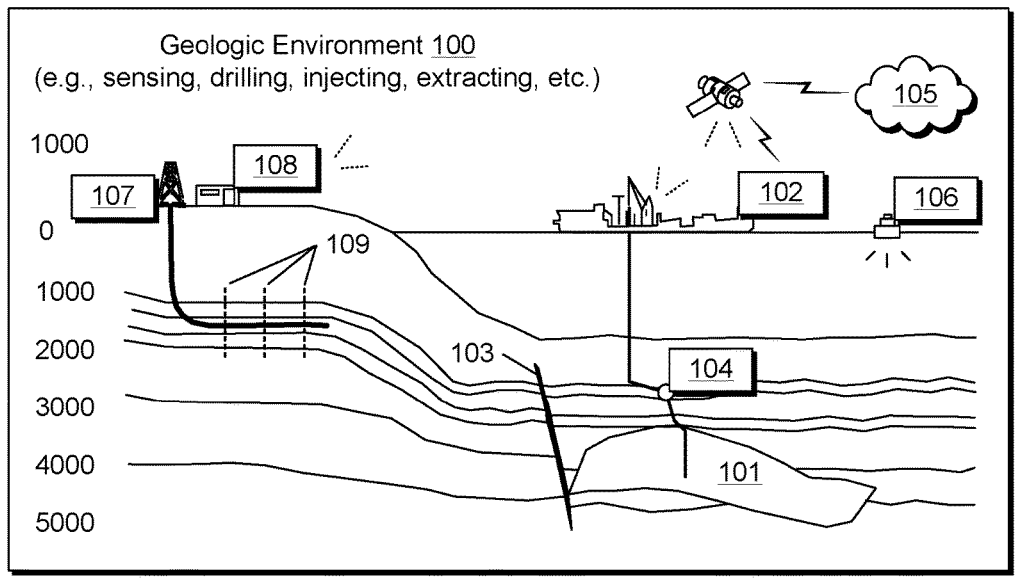
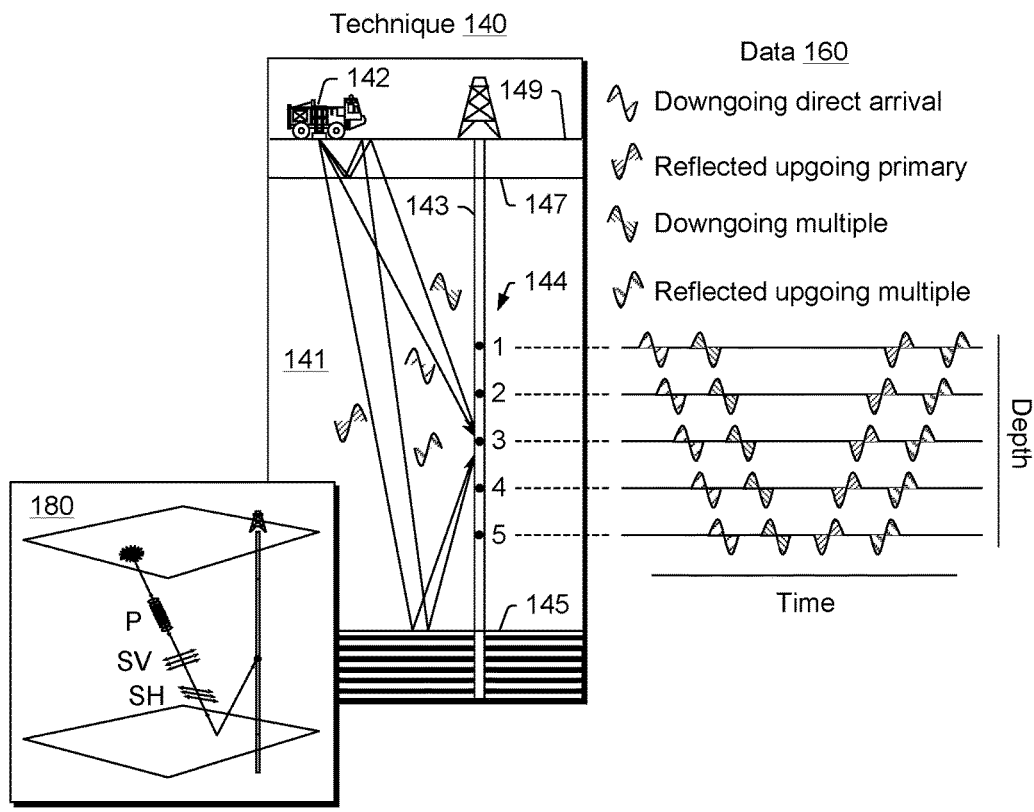
Fig. 1

Aperture 705

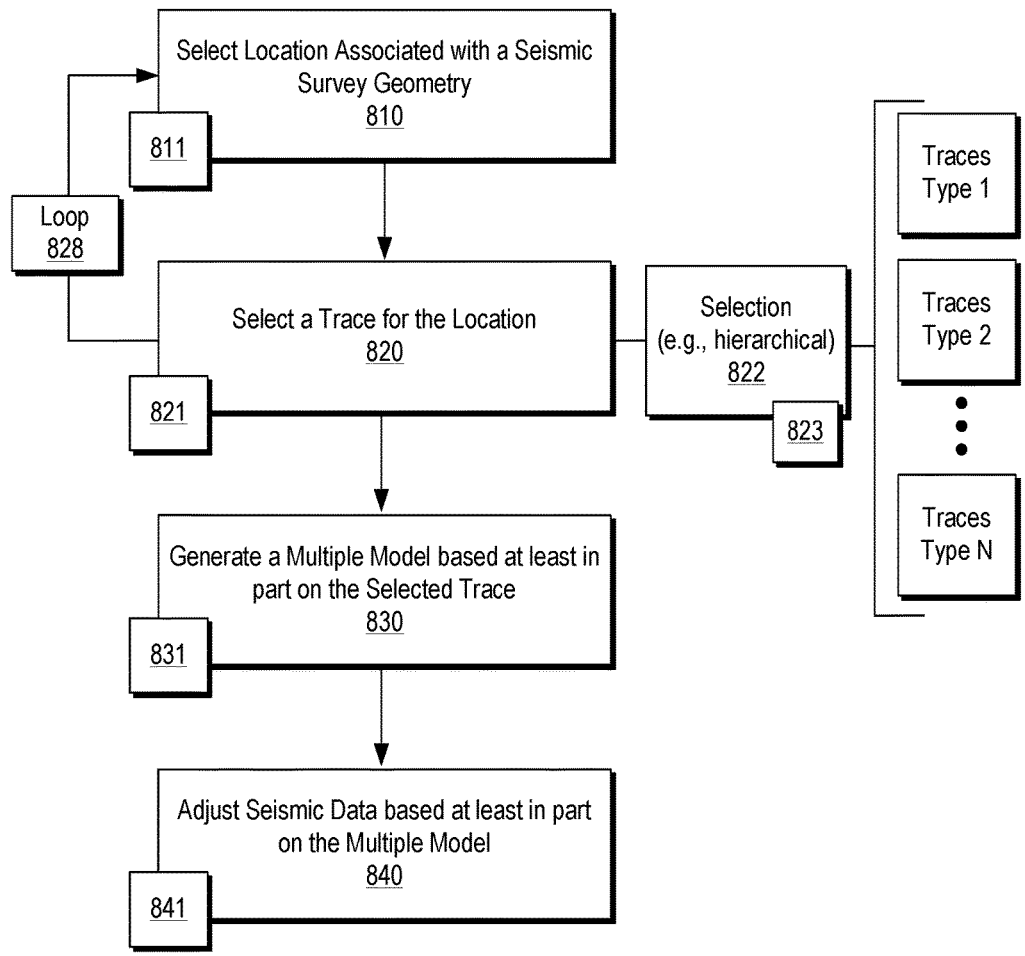
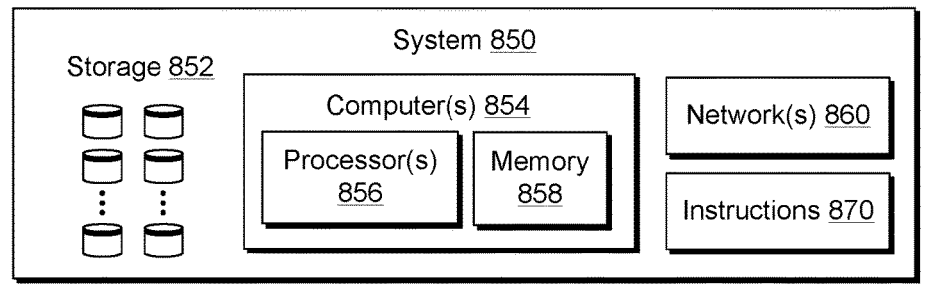
Fig. 8

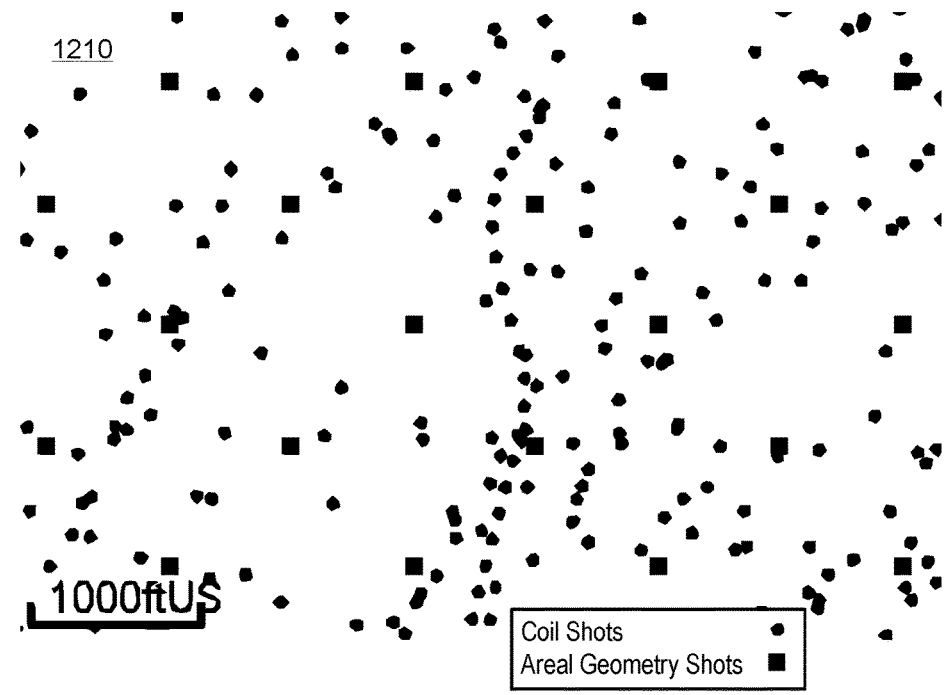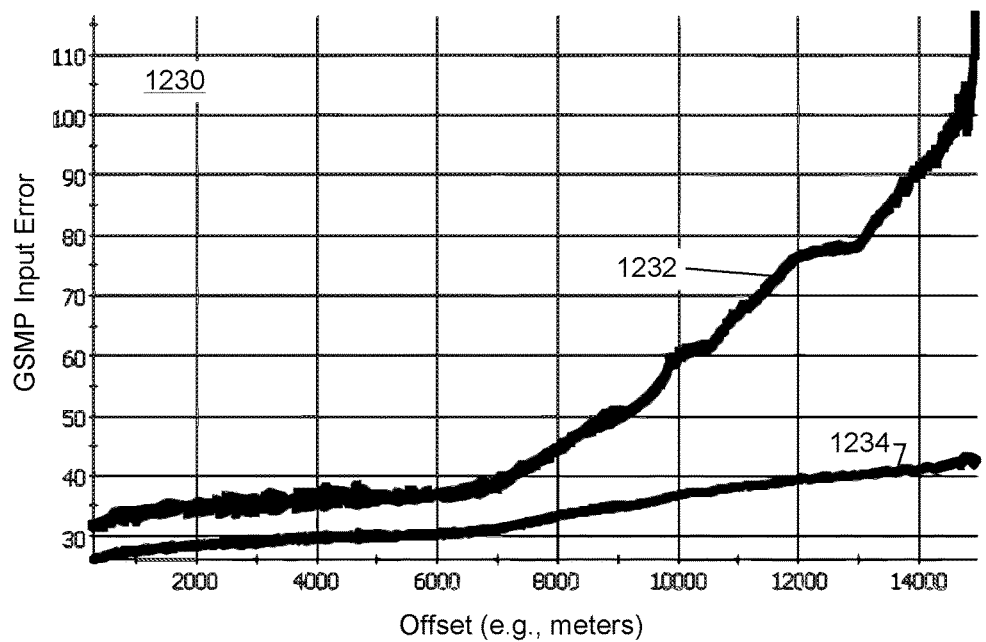
Fig. 12

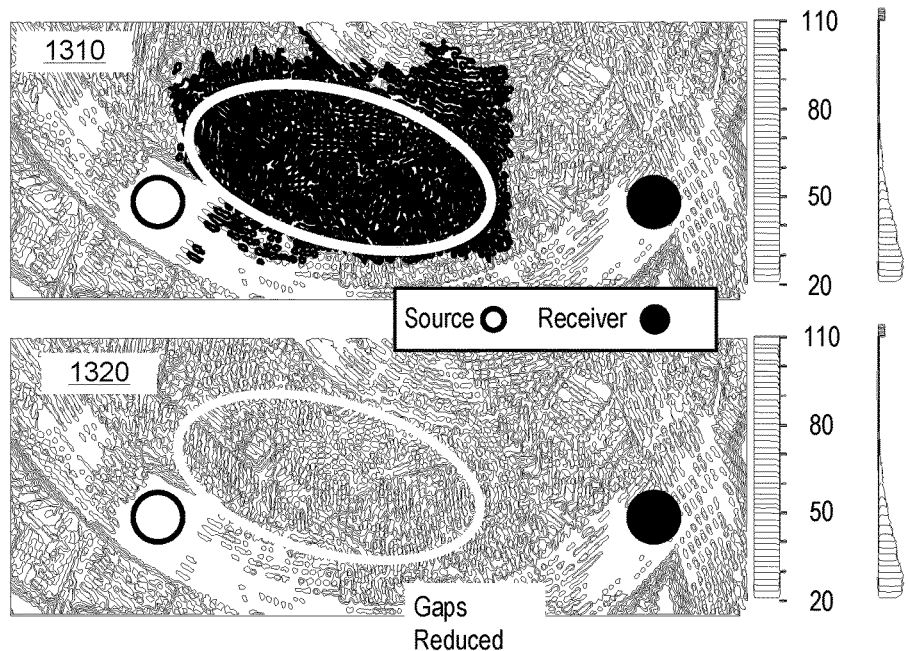
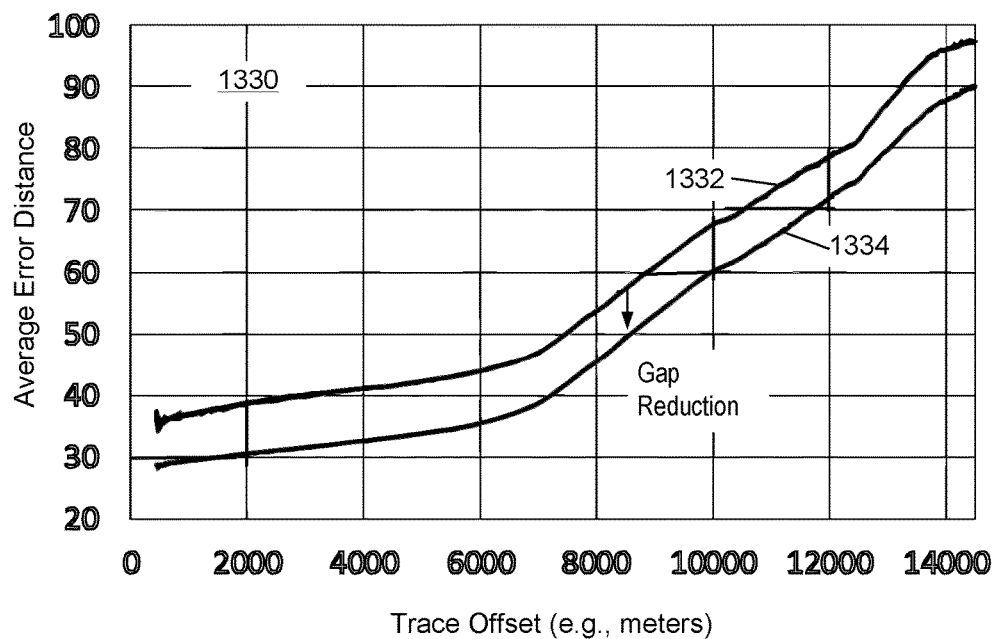
Fig. 13

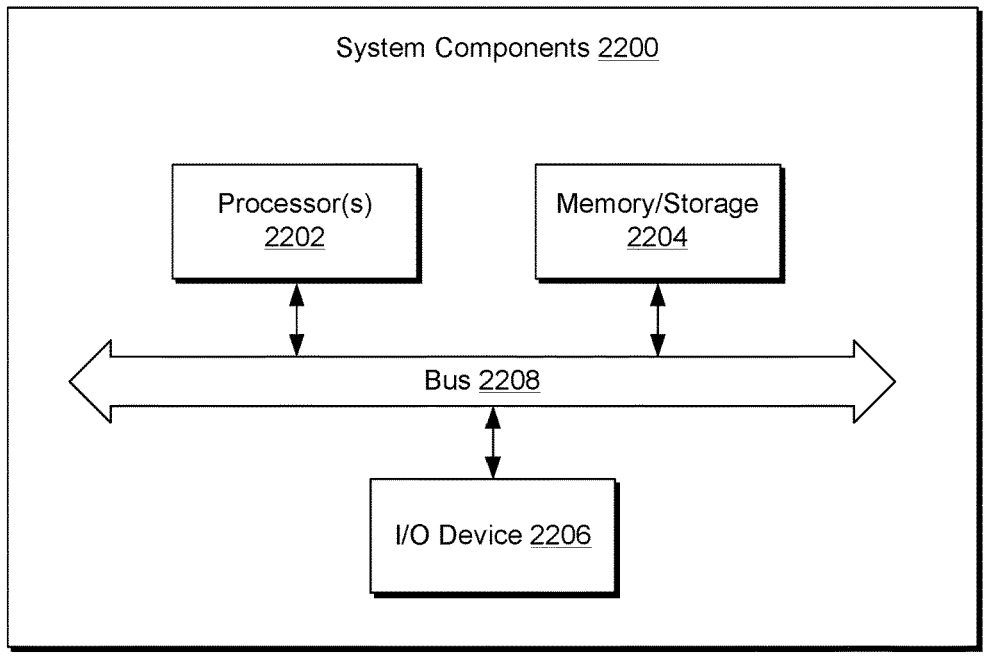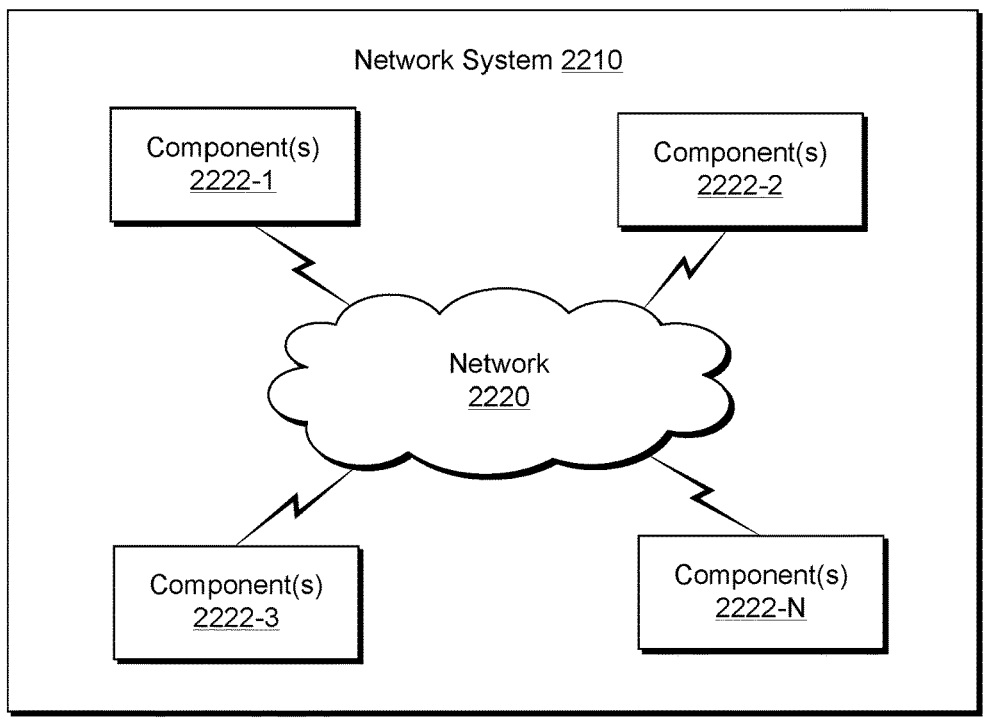
Fig. 22

US 10,295,687 B2

ATTENUATION OF MULTIPLE REFLECTIONS

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks.

SUMMARY

A method can include selecting a location associated with a seismic survey geometry; selecting a trace for the location where the trace is selected from one of a plurality of different types of traces that include real data traces, interpolated data traces and model data traces; generating a multiple model based at least in part on the selected trace; and adjusting seismic data based at least in part on the multiple model. A system can include a processor; memory accessible by the processor; processor-executable instructions stored in the memory to instruct the system to: select a location associated with a seismic survey geometry; select a trace for the location where the trace is selected from one of a plurality of different types of traces that include real data traces, interpolated data traces and model data traces; generate a multiple model based at least in part on the selected trace; and adjust seismic data based at least in part on the multiple model. One or more computer-readable storage media can include computer-executable instructions to instruct a system to: select a location associated with a seismic survey geometry; select a trace for the location where the trace is selected from one of a plurality of different types of traces that include real data traces, interpolated data traces and model data traces; generate a multiple model based at least in part on the selected trace; and adjust seismic data based at least in part on the multiple model.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates an example of a geologic environment and an example of a technique;

FIG. 8 illustrates an example of a method;
FIG. 12 illustrates examples of plots;
FIG. 13 illustrates examples of plots;
FIG. 22 illustrates example components of a system and a networked system.

DETAILED DESCRIPTION

Figure 2:
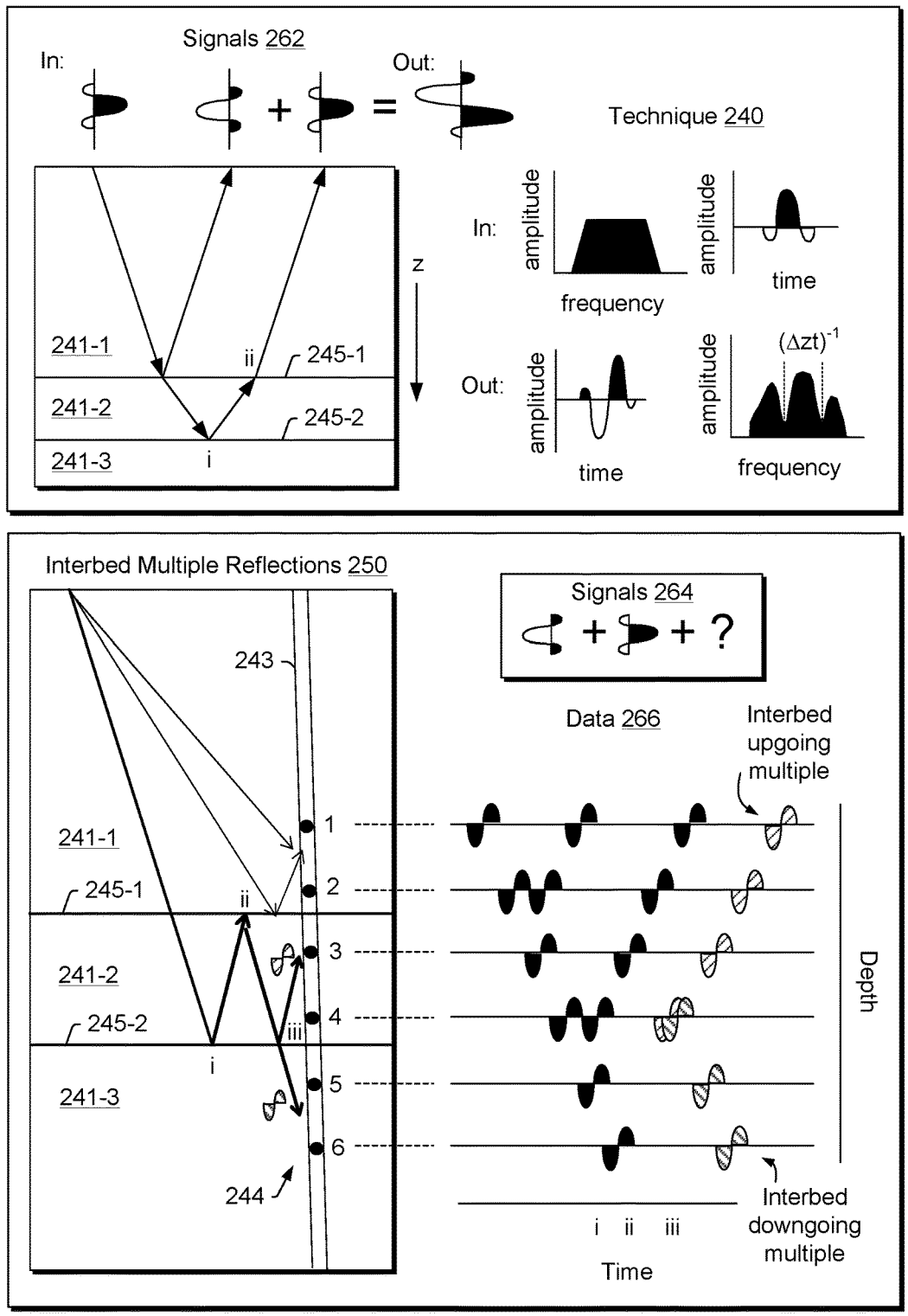
FIG. 2 illustrates examples of multiple reflections and examples of techniques.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less that 1 Hz and/or optionally more than 100 Hz). Seismic data may be processed and interpreted, for example, to understand better composition, fluid content, extent and geometry of subsurface rocks.

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data. As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, a system may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

In the example of FIG. 1, the geologic environment 100 may include layers (e.g., stratification) that include the reservoir 101 and that may be intersected by a fault 103 (see also, e.g., the one or more fractures 109, which may intersect a reservoir). As an example, a geologic environment may be or include an offshore geologic environment, a seabed geologic environment, an ocean bed geologic environment, etc.

As an example, the geologic environment 100 may be outfitted with a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces (see also, e.g., FIG. 2), evidence of a multiple from a water interface (e.g., an interface of a base of water and rock or sediment beneath it) or evidence of a multiple from an air-water interface, etc.

As shown in FIG. 1, acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example of parameters that may characterize anisotropy of media (e.g., seismic anisotropy), consider the Thomsen parameters $\varepsilon$, $\delta$ and $\gamma$. The Thomsen parameter $\delta$ describes depth mismatch between logs (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). Thus, the Thomsen parameters $\varepsilon$ and $\gamma$ may be estimated from wave data while estimation of the Thomsen parameter $\delta$ may involve access to additional information.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

FIG. 2 shows an example of a technique 240, examples of signals 262 associated with the technique 240, examples of interbed multiple reflections 250 and examples of signals 264 and data 266 associated with the interbed multiple reflections 250. As an example, the technique 240 may include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 241-1, 241-2 and 241-3 where an interface 245-1 exists between the layers 241-1 and 241-2 and where an interface 245-2 exists between the layers 241-2 and 241-3. As illustrated in FIG. 2, a wavelet may be first transmitted downward in the layer 241-1; be, in part, reflected upward by the interface 245-1 and transmitted upward in the layer 241-1; be, in part, transmitted through the interface 245-1 and transmitted downward in the layer 241-2; be, in part, reflected upward by the interface 245-2 (see, e.g., "i") and transmitted upward in the layer 241-2; and be, in part, transmitted through the interface 245-1 (see, e.g., "ii") and again transmitted in the layer 241-1. In such an example, signals (see, e.g., the signals 262) may be received as a result of wavelet reflection from the interface 245-1 and as a result of wavelet reflection from the interface 245-2. These signals may be shifted in time and in polarity such that addition of these signals results in a waveform that may be analyzed to derive some information as to one or more characteristics of the layer 241-2 (e.g., and/or one or more of the interfaces 245-1 and 245-2). For example, a Fourier transform of signals may provide information in a frequency domain that can be used to estimate a temporal thickness (e.g., $\Delta zt$) of the layer 241-2 (e.g., as related to acoustic impedance, reflectivity, etc.).

As to the data 266, as an example, they illustrate further transmissions of emitted energy, including transmissions associated with the interbed multiple reflections 250. For example, while the technique 240 is illustrated with respect to interface related events i and ii, the data 266 further account for additional interface related events, denoted iii, that stem from the event ii. Specifically, as shown in FIG. 2, energy is reflected downward by the interface 245-1 where a portion of that energy is transmitted through the interface 245-2 as an interbed downgoing multiple and where another portion of that energy is reflected upward by the interface 245-2 as an interbed upgoing multiple. These portions of energy may be received by one or more receivers 244 (e.g., disposed in a well 243) as signals. These signals may be summed with other signals, for example, as explained with respect to the technique 240. For example, such interbed multiple signals may be received by one or more receivers over a period of time in a manner that acts to "sum" their amplitudes with amplitudes of other signals (see, e.g., illustration of signals 262 where interbed multiple signals are represented by a question mark "?"). In such an example, the additional interbed signals may interfere with an analysis that aims to determine one or more characteristics of the layer 241-2 (e.g., and/or one or more of the interfaces 245-1 and 245-2). For example, interbed multiple signals may interfere with identification of a layer, an interface, interfaces, etc. (e.g., consider an analysis that determines temporal thickness of a layer, etc.).

Figure 3:
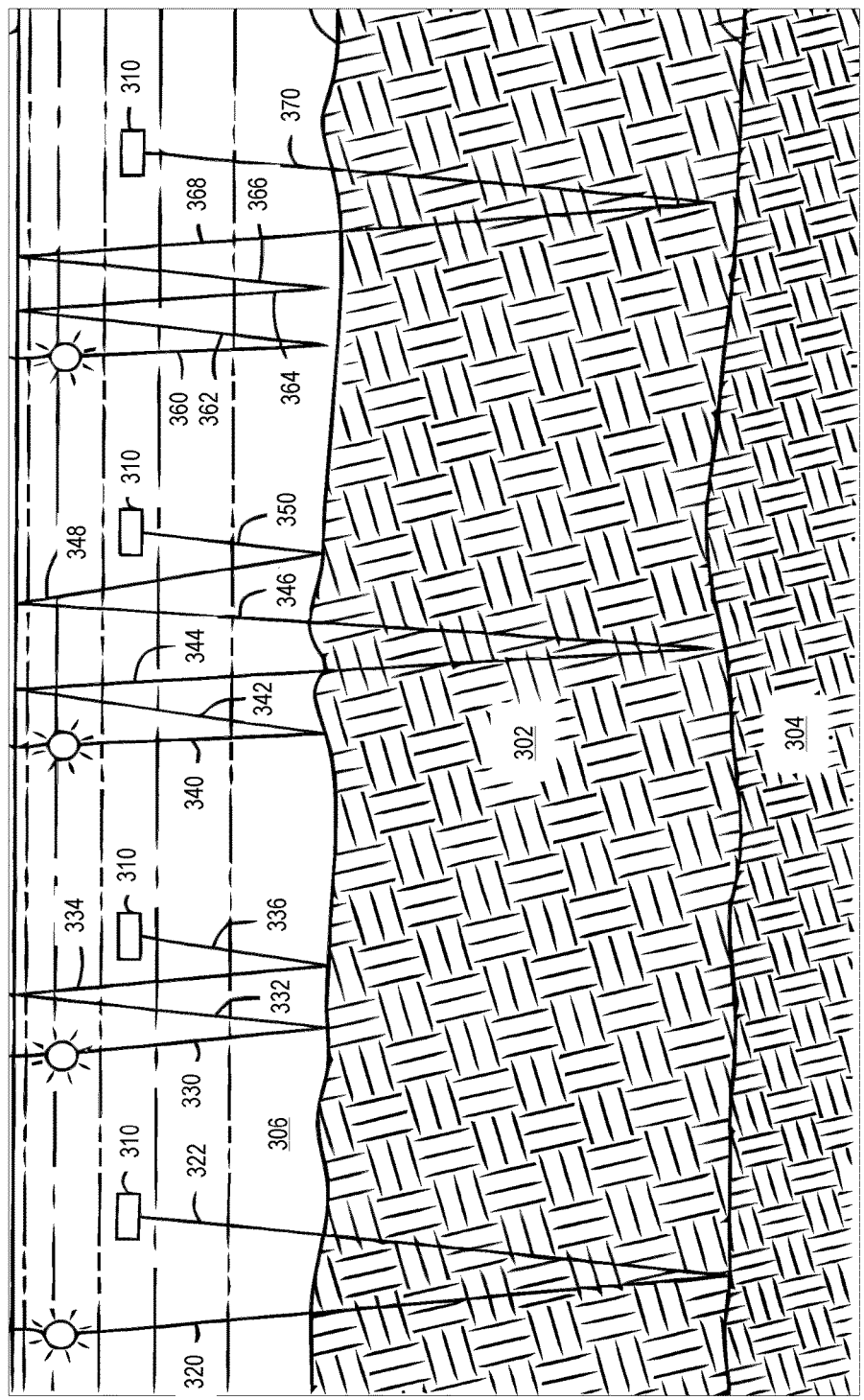
FIG. 3 illustrates an example of a diagrammatic view of marine seismic surveying.

FIG. 3 shows a diagrammatic view of marine seismic surveying. Subterranean formations to be explored, such as 302 and 304, lie below a body of water 306. Seismic energy sources 308 and seismic receivers 310 are positioned in the body of water 306, for example, by one or more seismic vessels. A seismic source 308, such as an air gun, creates seismic waves in the body of water 306 and a portion of the seismic waves travels downward through the water toward the subterranean formations 302 and 304 beneath the body of water 306. When the seismic waves reach a seismic reflector, a portion of the seismic waves reflects upward and a portion of the seismic waves continues downward. The seismic reflector can be the water bottom 312 or one of the interfaces between two subterranean formations, such as interface 314 between formations 302 and 304. When the reflected waves traveling upward reach the water/air interface at the water surface 316, a majority portion of the waves reflects downward again. Continuing in this fashion, seismic waves can reflect multiple times between upward reflectors, such as the water bottom 312 or formation interfaces below, and the downward reflector at the water surface 316 above, as described more fully below. Each time the reflected waves propagate past the position of a seismic receiver 310, the receiver 310 senses the reflected waves and generates representative signals.

Primary reflections are those seismic waves which have reflected a single time, from the water bottom 312 or an interface between subterranean formations, before being detected by a seismic receiver 310. An example of a primary reflection is shown in FIG. 3 by raypaths 320 and 322. Primary reflections include desirable information about the subterranean formations. Surface multiples are those waves which have reflected multiple times between the water surface 316 and one or more upward reflectors, such as the water bottom 312 or formation interfaces, before being sensed by a receiver 310. An example of a surface multiple which is specifically a water bottom multiple is shown by raypaths 330, 332, 334 and 336. The point on the water surface 316 at which the wave is reflected downward is generally referred to as the downward reflection point 333. The surface multiple starting at raypath 330 is a multiple of order one, since the multiple contains one reflection from the water surface 316. Two examples of general surface multiples with upward reflections from both the water bottom 312 and formation interfaces are shown by raypaths 340, 342, 344, 346, 348 and 350 and by raypaths 360, 362, 364, 366, 368 and 370. Both of these latter two examples of surface multiples are multiples of order two, since the multiples contain two reflections from the water surface 316. As an example, a surface multiple can be of order i if the multiple contains i reflections from the water surface 316. Surface multiples can be classified as extraneous noise that can obscure a primary reflection signal.

Surface multiple attenuation can be a prestack inversion of a recorded wavefield which removes orders of surface multiples present within the marine seismic signal. Unlike some wave-equation-based multiple-attenuation algorithms, surface multiple attenuation can be performed without modeling of or assumptions regarding the positions, shapes and reflection coefficients of the multiple-causing reflectors. Surface multiple attenuation can include considerations as to internal physical consistency between primary and multiple events that exist in a recorded marine data set.

As an example, the travel time for a water bottom multiple can be a function of the offset, a distance between the source and receiver, and a number of times the multiple reflects from the surface. For example, if the multiple reflects from the surface once before being received by the microphone and the offset is zero, the travel time is twice that of the principal waves. Such an approach may be used in various schemes to remove multiples.

As an example, a surface multiple prediction algorithm may include convolutions of pairs of traces, for which the receiver location for one trace of the pair is coincident with the shot location for the other trace. As source and receiver locations in recorded data tend to lack precise coincidence, a dataset may be regularized to a nominal geometry such that this coincidence of source and receiver locations is achieved. In such an approach multiples may be predicted for the regular geometry, and then deregularized to the original geometry before subtraction.

As an example, a method can include various actions that aim to minimize errors caused by regularization and/or deregularization processes by minimizing involvement of a regularization process and/or a deregularization process. As an example, a method can include receiving data from subsurface lines in an effort to minimize a regularization processes. As an example, a method can involve convolutions of traces from different subsurface lines. As an example, a method may operate on a trace-by-trace basis.

As an example, a generalized implementation of a three dimensional surface-related multiple prediction (SMP) algorithm may operate without assumptions about regularity or distribution of traces in a recorded dataset (e.g., without a concept of a nominal geometry). In such an example, a recorded dataset may be treated as a collection of traces defined by their source and receiver locations. As an example, a method can include predicting multiples for one or more sets of traces that may be defined by their source and receiver locations. In particular, such a method may predict multiples at a location, offset and azimuth.

As an example, a method can include predicting a plurality of surface multiples for a plurality of target traces in a record of seismic data. Such a method may include creating a file containing information regarding a plurality of pairs of recorded traces. Such a method can include convolving the pairs of recorded traces to generate a plurality of convolutions and stacking the convolutions for each target trace.

As an example, a method can include selecting a target trace; selecting a potential downward reflection point for the selected target trace; and computing at least one of a desired shot-side midpoint, offset and azimuth, and at least one of a desired receiver-side midpoint, offset and azimuth using the selected potential downward reflection point and the selected target trace. The desired shot-side midpoint, offset and azimuth can define a desired shot-side trace. The desired receiver-side midpoint, offset and azimuth can define a desired receiver-side trace. Such a method may also include determining a pair of recorded traces substantially closest to the desired shot-side trace and to the desired receiver-side trace; and convolving the pair of recorded traces to generate a convolution.

Figure 4:
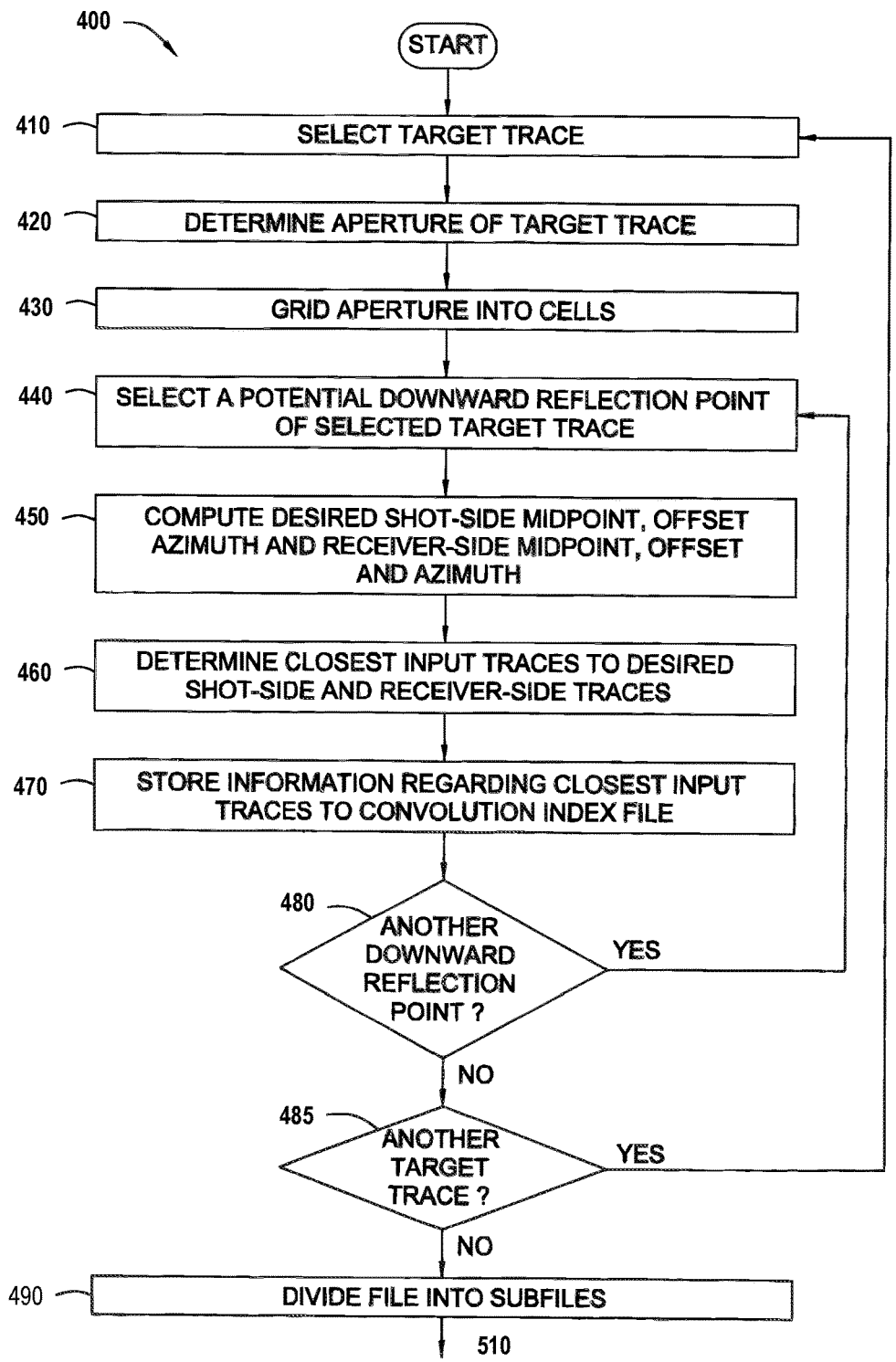
FIG. 4 illustrates an example of a method for performing a three dimensional surface multiple prediction.
Figure 7:
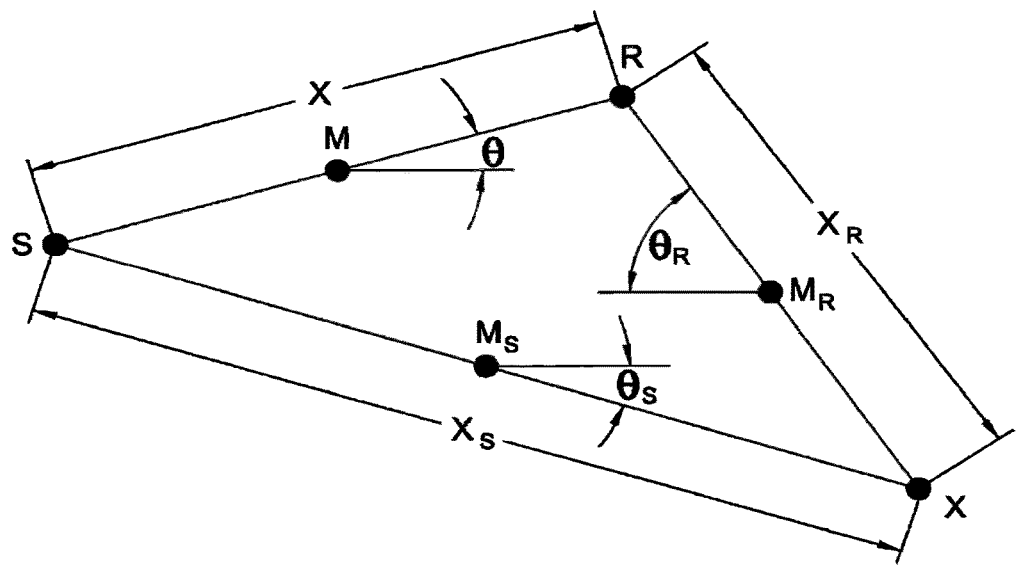
FIG. 7 illustrates an example of a plan view of an acquisition geometry.

FIG. 4 illustrates a flow diagram of the first stage 400 in a method for performing a three dimensional surface multiple prediction in accordance with one or more embodiments. At block 410, a target trace is selected. An example of a selected target trace aperture 705 is illustrated in FIG. 7 as trace (S, R). Target traces define the locations at which the multiples are to be predicted. At block 420, the aperture 705 for the selected target trace is determined or defined. The aperture 705 may be a polygonal area and centered on a midpoint location M of the target trace. Other geometrical shapes for the aperture 705 may be used. The aperture 705 is defined to include substantially all the potential downward reflection points (DRPS) of the surface multiples for the target trace. As an example, a potential downward reflection point X is illustrated in FIG. 7. At block 430, the aperture 705 is gridded into a plurality of cells. In one embodiment, the midpoint of the target trace is located on one of the grid nodes (cell centers). The grid spacing may be arbitrary. The grid nodes define the potential DRPs for the target trace.

At block 440, a potential DRP, such as a first DRP, for the selected target trace is selected. At block 450, the desired shot-side midpoint $M_S$, offset $X_S$ and azimuth $\Theta_S$ and the desired receiver-side midpoint $M_R$, offset $X_R$ and azimuth $\Theta_R$ are computed. $M_S$ is the midpoint location between the source and the selected potential DRP. Offset $X_S$ is the horizontal distance between the selected potential DRP and the source S. Azimuth $\Theta_S$ is defined as the angle between the line that connects the source S and the selected potential DRP and some fixed direction, which can be the in-line direction. $M_R$ is the midpoint location between the receiver R and the selected potential DRP. Offset $X_R$ is the horizontal distance between the selected potential DRP and the receiver R. Azimuth $\Theta_R$ is defined as the angle between the line that connects the receiver R and the selected potential DRP and some fixed direction, which can be the in-line direction. In one embodiment, the desired shot-side midpoint $M_S$, offset $X_S$ and azimuth $\Theta_S$ and the desired receiver-side midpoint $M_R$, offset $X_R$ and azimuth $\Theta_R$ are computed based on the selected target trace and the selected potential DRP. The midpoints, offsets and azimuths together define the desired shot-side trace (S, X) and the desired receiver-side trace (X, R).

At block 460, the input trace closest to the desired shot-side trace and the input trace closest to the desired receiver-side trace are determined. In one embodiment, the closest input traces are determined by minimizing an objective function, which defines the closeness of two traces based on their midpoints, offsets and azimuths. An example of an objective function is $$D^2 = |\Delta m|^2 + w_x |\Delta x|^2 + w_{73} |\Delta \Theta|^2$$

where D measures the closeness between the traces, $\Delta m$, $\Delta x$ and $\Delta \Theta$ are the differences in midpoint, offset and azimuth respectively, and $w_x$ and $w_\Theta$ are weights defining the relative impact of errors in offsets and azimuths as compared to the error in midpoints.

Notably, $w_x$ is dimensionless, whereas $w_\Theta$ has dimensions of $L^2$. In one embodiment, $w_\Theta$ is set to zero due to lack of desired azimuth coverage of the input dataset. In another embodiment, there may be a minimum value for the minimized objective function, above which there is deemed to be no matching trace.

At block 470, information regarding the closest input traces is stored in a file, which may be referred to as a convolution index file (CIF). For example, such information may include identifiers for the closest input traces, their associated subsurface lines, the selected potential downward reflection point X, the desired shot-side midpoint $M_S$, offset $X_S$ and azimuth $\Theta_S$, the desired receiver-side midpoint $M_R$, offset $X_R$ and azimuth $\Theta_R$, and the selected target trace to be predicted.

At block 480, a determination is made as to whether the aperture includes another potential DRP for the selected target trace. If the answer is in the affirmative, then processing returns to block 440, at which another potential DRP is selected. If the answer is in the negative, then processing continues to block 485, at which a determination is made as to whether another target trace exists. If the answer is in the affirmative, then processing returns to block 410, at which another target trace is selected. If the answer is in the negative, then processing continues to block 490, at which the CIF is divided into one or more subfiles according to pairs of subsurface lines containing closest input traces. In this manner, each subfile contains information directed to a pair of subsurface lines, where each subsurface line contains an input trace closest to either a desired shot-side trace or a desired receiver-side trace.

Figure 5:
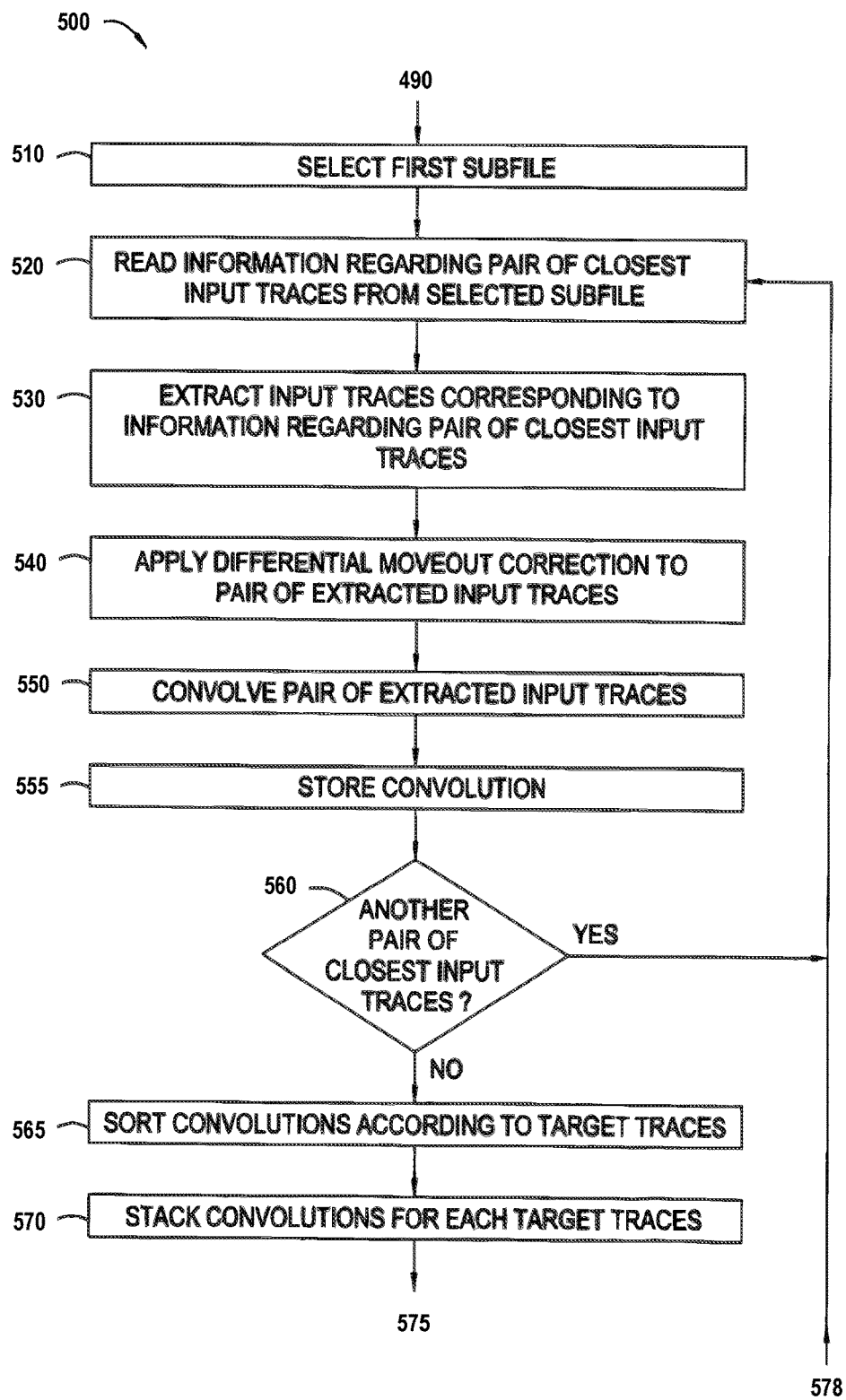
FIG. 5 illustrates an example of a portion of a method for performing a three dimensional surface multiple prediction.
Figure 6:
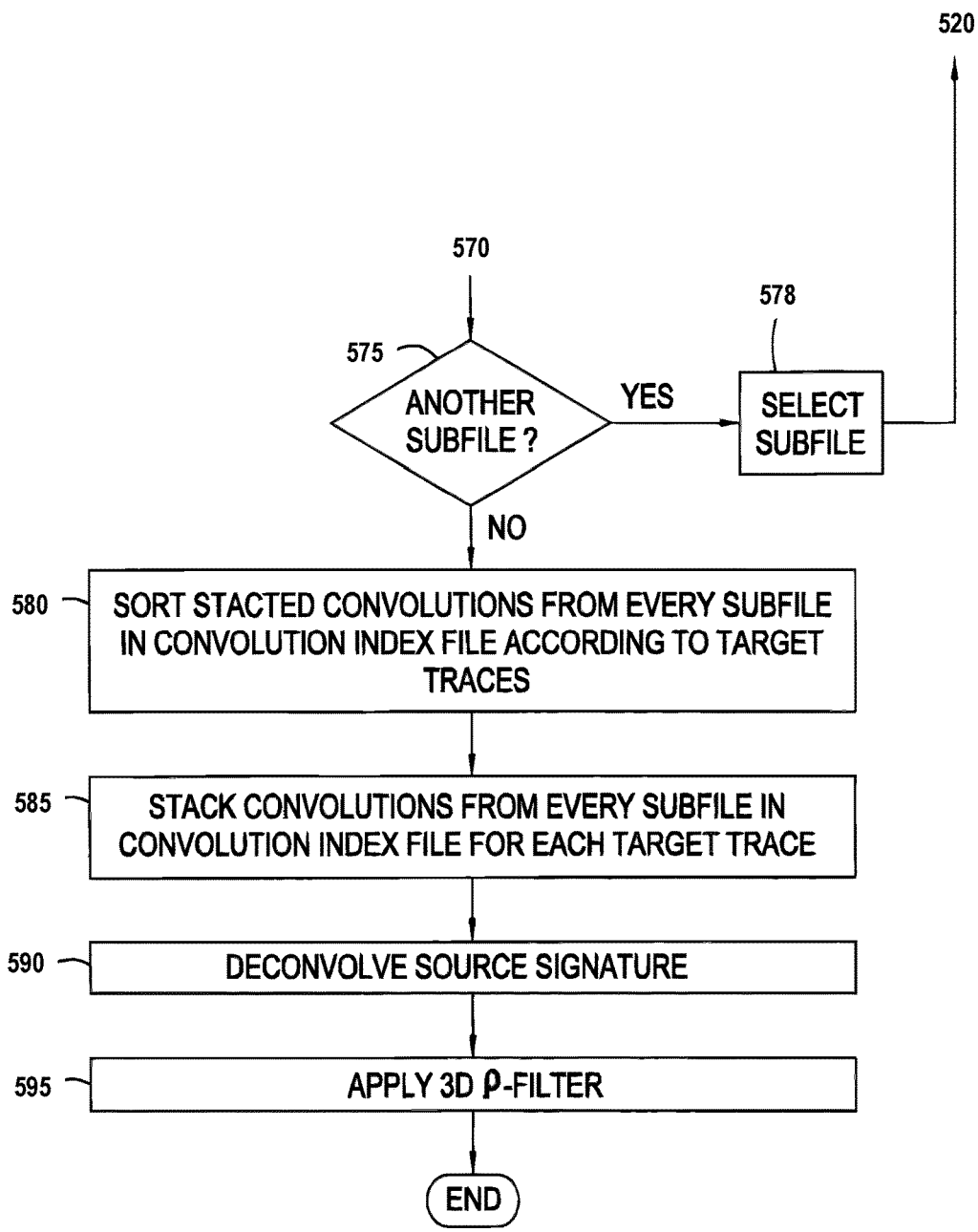
FIG. 6 illustrates an example of another portion of the method of FIG. 6.

FIGS. 5 and 6 illustrate a flow diagram of the second stage 500 in a method for performing a three dimensional surface multiple prediction. At block 510, the first subfile is selected. At block 520, information regarding a pair of input traces closest to a desired shot-side trace and a desired receiver-side trace for a selected target trace is read from the selected subfile. At block 530, a pair of input traces corresponding to the information regarding the pair of closest input traces is extracted from a set of recorded seismic data.

The recorded set of seismic data may be stored in as a file, for example, in a data storage device or system. The set of recorded seismic data may be extrapolated to zero offset. The set of recorded seismic data may be a collection of prestack traces defined by midpoint, offset and azimuth. Each trace in the recorded seismic data set may have a subsurface line identifier and a trace identifier that can be used to identify the input trace within the recorded seismic data set. The set of recorded seismic data may be organized into subsurface lines, or one or more other subdivisions, such as sail lines.

At block 540, a differential moveout correction (e.g., differential normal moveout or differential NMO, etc.) is applied to the pair of extracted recorded traces to adjust the offsets of the extracted recorded traces to the desired shot-side offset and the desired receiver-side offset. At block 550, the pair of adjusted and extracted recorded traces are convolved. At block 555, the convolution is stored.

At block 560, a determination is made as to whether the selected subfile contains another pair of input traces to be convolved. If the answer is in the affirmative, then processing returns to block 520. If the answer is in the negative, then processing continues to block 565, at which the convolutions are sorted according to target traces. At block 570, all the convolutions for each target trace are stacked together to obtain a single, stacked convolution per target trace for the selected subfile.

At block 575, a determination is made as to whether another subfile of the CIF exists. If the answer is in the affirmative, then that subfile is selected (block 578) and processing returns to block 520. If the answer is in the negative, then processing continues to block 580, at which all the stacked convolutions from each subfile in the CIF are sorted according to target traces. At block 585, all the stacked convolutions from each subfile in the CIF are stacked for each target trace to obtain a single, stacked convolution per target trace from all subfiles.

At block 590, the source signature is deconvolved according to one or more techniques. At block 595, a three dimensional p-filter may be applied to adjust for the stacking effect on the wavelet according to one or more techniques.

As an example, a method can include removing multiples from seismic data. For example, a method can include a surface-related multiple elimination (SRME) technique (e.g., a multiple attenuation technique) that includes convolving legs of multiples where they may be independently recorded to predict the multiples in the data and to enhance the data.

As an example, a method can include receiving real data from multiple geometries and can include receiving data generated directly or indirectly from the real data, for example, to simulate one or more portions of the geometry which is lacking as to real data or lacking as to quality of real data. In such an example, the method can include forming a multiple model from data that can include real data, interpolated real data, synthetic data, etc.

As an example, real data can be data acquired one or more surveys, geometries and/or vintages. As an example, generated data can be data derived from one or more techniques that creates data that is other than real data. For example, generated data can be synthetic data generated by a model or models, interpolated data, which can be interpolated data generated from one or more sets of real data, or one or more other types of data generated to fill or enhance a seismic survey data.

As an example, modelling may include generating data from an image of real data (e.g., via migration) and creating a geometry to complement the real data.

As an example, modelled data can be a relatively accurate representation of original data where, for example, these data have approximately the same geometry and are able to produce data that is representative of data for distinct geometries. As an example, one or more types of data can be used in conjunction with a real type of data such that a demultiple prediction algorithm can select the most appropriate data to be able to reliably model multiples.

As an example, a selection process can utilize one or more criteria. For example, consider a generalized surface multiple prediction (GSMP) type of approach where individual traces used in calculation of a multiple model are selected from the best seismic energy source to minimize errors.

As an example, where real data traces exist they can be used, where larger gaps that can be interpolated exist, interpolation generated traces can be used and where there are limited traces in proximity of desired traces, modelled traces can be used. As an example, a method can proceed on a trace-by-trace basis, optionally implemented using parallel processing.

Surface multiple prediction methods in the class of SRME can include convolving different parts of real data to simulate multiples in the data. Such approach can convolve data for possible downward reflection points and sum the related convolutions to create a model for a specific trace.

As SRME approach may be somewhat limited where seismic real data traces are lacking as to their existence or as to quality. As an example, a method can include selecting traces from one or more types of traces that are not real traces for a particular geometry. As mentioned, such traces may be generated traces (e.g., synthetic, interpolated, etc.). As an example, a trace may be a trace from a different survey, which can also be considered to be a generated trace for a geometry as it does not correspond to acquired real data traces for that specific geometry.

As an example, a method can include applying differential normal moveout (NMO) and can include implementing a selection procedure with one or more adjustable weights that can aim to identify appropriate traces to which differential NMO can be applied.

As mentioned, data can be selected from one or more surveys. As an example, a selection process can include considering factors such as, for example, change in condition (e.g., water velocity, etc.) from one survey to another survey.

As an example, one or more techniques can be utilized to construct data in one or more ways for one or more parts of a geometry. As an example, a plurality of techniques may be utilized to provide data such that a variety of datasets (e.g., real, synthetic, interpolated, etc.) are available.

As an example, a method can include modelling of migrated datasets to generate data on an acquisition geometry that is distinct from that of acquired real data of a survey. Such an approach may be applied, for example, where differences are large enough that differential NMO is not expected to make adequate adjustments.

As an example, a method can include implementing a search, which may be a hierarchical search based on one or more criteria. As an example, a search can be a GSMP type of search. As mentioned, a search may proceed on a trace-by-trace basis, noting that a method may be implemented, at least in part, using parallel processing (e.g., multiple cores, virtual machines, multiple computers, etc.).

As an example, a method can include accessing data where the data includes various types of trace data (e.g., real, synthetic, interpolated, etc.). Such a method can include searching one or more sets of the types of trace data for best contributions according to one or more criteria (e.g., weights). As an example, a type of trace data can be interpolated data that may, for example, fill one or more gaps in real data of a survey where the interpolated data may be generated using one or more interpolation algorithms. As an example, a method can include input being modelled from a migrated image to produce data akin to real data but on distinct geometries. As an example, a method can include modeling of different orders of multiples.

As an example, a method can use a combination of real and created data to generate an accurate model of multiples in the real data. As mentioned, real data can be associated with one or more of multiple geometries and/or vintages. As an example, created data can be created through one or more techniques, including, for example, interpolation and model-based techniques. As an example, an algorithm can include combining a plurality of types of data and choosing the best trace for each location based on one or more criteria that include one or more geometry measures and/or, for example, one or more quality measures (e.g., according to a data source, etc.). As an example, chosen data can then be adjusted for offset using differential NMO before being used in a convolution operation.

As an example, interpolated and/or modeled data can be created at an "ideal" geometry such that relatively small-scale differential NMO can be used to efficiently leverage the more expensive interpolators for many multiple contribution gathers (MCGs), which may help to reduce full regularization of the data.

As an example, inclusion of created (e.g., interpolated, modeled, etc.) data can allow an algorithm to fill gaps while limiting the distances across which differential NMO is used. As an example, modeled data can be created through a finite-difference method (FDM) using a depth-domain image as a starting point. In such an example, events in the modeled data can relate to events in the recorded data, for example, with inaccuracies depending on the fidelity of the modeling process.

As an example, one or more trace criteria can allow real and created data types to be combined for enhanced results compared to real data alone. As an example, a method can include a hierarchy where the highest-quality real data traces are given a higher preference, for example, followed by interpolated traces, which may be used to fill smaller gaps according to their interpolation quality, and then followed by modeled traces, which may be used to fill larger gaps (e.g., the largest of gaps, etc.). As an example, a method can implement a tree-based search method (e.g., as in a GSMP approach) where the search can consider a plurality of different types of data. In such an example, the search can be implemented in a manner that determines tradeoffs as to selection of a type of data from a plurality of types of data, for example, via use of one or more quality metrics.

FIG. 8 shows an example of a method 800 and an example of a system 850. As shown, the method 800 includes a selection block 810 for selecting a location, a selection block 820 for selecting a trace for the location, a generation block 830 for generating a multiple model (e.g., a multiples model, etc.), and an adjustment block 840 for adjusting seismic data based at least in part on the multiple model. In such an example, a selection hierarchy 822 may be implemented for selecting one of a plurality of types of traces, for example, from traces of type 1, traces of type 2, to traces of type N, where N may be 0 to indicate that two types of traces exist or where N may be 3 or more. In the example of FIG. 8, a loop block 828 indicates that the method 800 can loop for a plurality of traces where, for example, the adjustment block 830 may proceed, optionally after a plurality of traces have been selected per the selection block 820.

As an example, the method 800 can include selecting a location associated with a seismic survey geometry per the selection block 810; selecting a trace for the location per the block 820 where the trace is selected from one of a plurality of different types of traces that include real data traces, interpolated data traces and model data traces (see, e.g., traces type 1, etc.); generating a multiple model based at least in part on the selected trace per the block 830; and adjusting seismic data based at least in part on the multiple model per the block 840. As an example, such adjusting can include attenuating multiple reflections in the seismic data. For example, data that corresponds to multiple reflections may be adjusted to minimize data values (e.g., amplitude, etc.). In such an example, other reflections (e.g., primary, etc.) may be more readily discerned, for example, for interpretation, etc. As an example, the method 800 can include rendering information to a display. For example, a graphic may be rendered in association with seismic data to indicate a type of trace selected for a location or locations.

As an example, the method 800 may be performed automatically such that selection of locations and selection of corresponding traces occurs automatically (e.g., via execution of processor-executable instructions of a computing device or system). As an example, one or more graphics (e.g., plots, graphical user interfaces, etc.) may be rendered to a display or displays during execution of instructions that select traces per the selection block 820.

The method 800 may be associated with various computer-readable media (CRM) blocks or modules 811, 821, 823, 831 and 841. Such blocks can include instructions suitable for execution by one or more processors (or processor cores) to instruct a computing device or system to perform one or more actions. As an example, a single medium may be configured with instructions to allow for, at least in part, performance of various actions of the method 800. As an example, a computer-readable medium (CRM) may be a computer-readable storage medium, which is not a carrier wave, that is not a signal and that is non-transitory.

As shown in FIG. 8, the system 850 may include one or more information storage devices 852, one or more computers 854, one or more network interfaces 860 and instructions 870. As to the one or more computers 854, each computer may include one or more processors (e.g., or processing cores) 856 and memory 858 for storing instructions 870, for example, executable by at least one of the one or more processors 856. As an example, a computer may include one or more network interfaces (e.g., wired or wireless), one or more graphics cards, a display interface (e.g., wired or wireless), etc. As an example, the system 850 may be configured to perform a method such as the method 800.

As an example, the system 850 may include the one or more information storage devices 852 that store information and/or the one or more network interfaces 860 that may be operatively coupled to one or more information storage devices that store information (e.g., the one or more information storage devices 852 or one or more other information storage devices). For example, the system 850 may access and receive stored information via an interface, which may be a network interface or other type of interface. As an example, information, such as stack information, may be provided as stored information (e.g., stored in one or more information storage devices). As an example, information may be received by a processor or processors, for example, via an internal bus and/or via an external bus of a computing device (e.g., a computer, a server, etc.). As an example, a network interface may be part of an external bus, which may be, at least in part, for example, wired and/or wireless.

Figure 9:
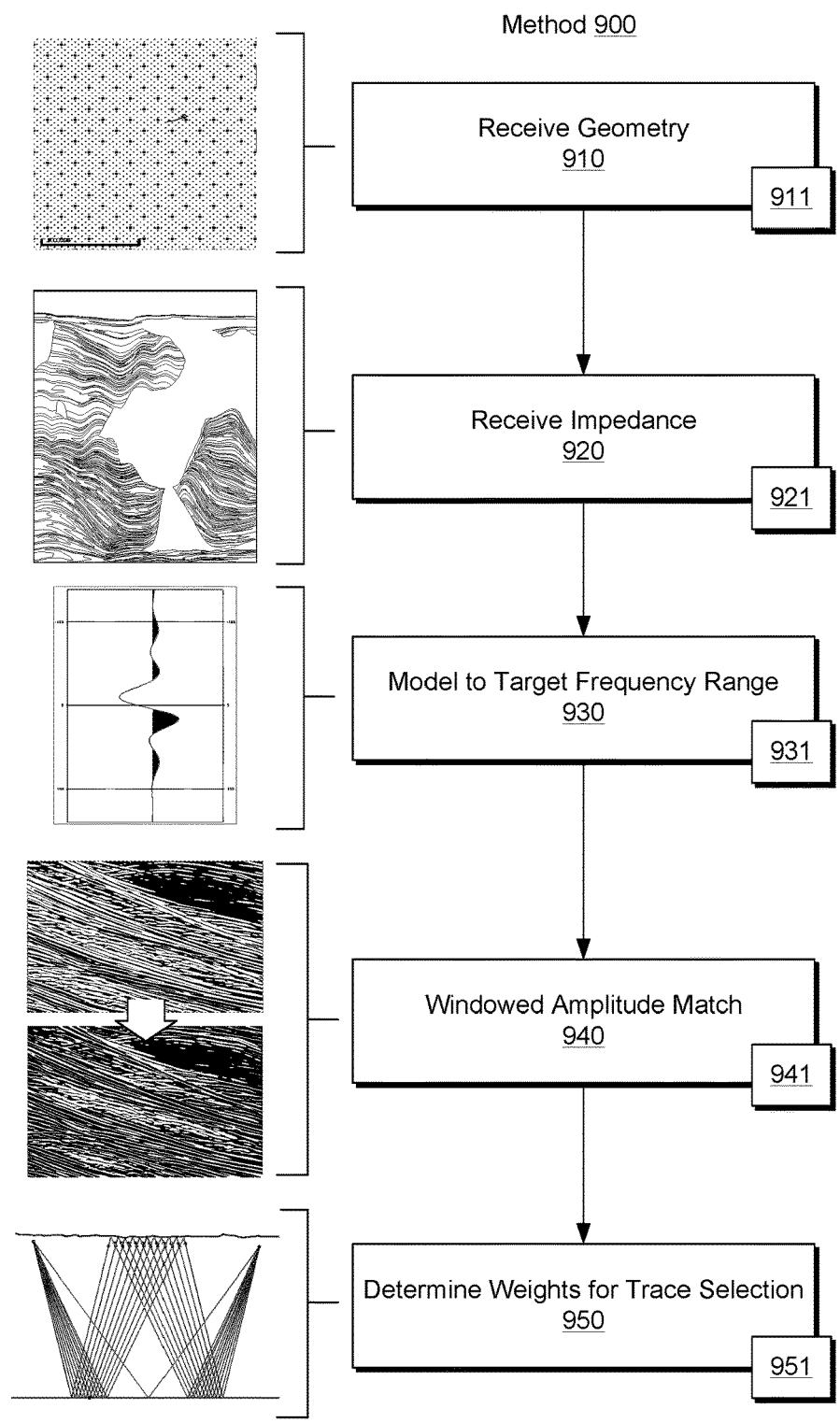
FIG. 9 illustrates an example of a method.

FIG. 9 shows an example of a method 900 that includes a reception block 910 for receiving a geometry, a reception block 920 for receiving impedance values associated with the geometry, a model block 930 for modeling to a target frequency range, a match block 940 for windowed amplitude matching and a weight block 950 for weighting for selection of a trace.

In the example of FIG. 9, the reception block 910 can include generating an areal or other desired input geometry, the reception block 920 can include receiving impedance values as based on a velocity model and image converted to density and then impedance, the model block 930 can include finite-difference modeling to a target frequency range, the match block 940 can include windowed amplitude matching and the weight block 950 can include weighting for automatic selection of a best trace (e.g., via a GSMP approach).

The method 900 may be associated with various computer-readable media (CRM) blocks or modules 911, 921, 931, 941 and 951. Such blocks can include instructions suitable for execution by one or more processors (or processor cores) to instruct a computing device or system to perform one or more actions. As an example, a single medium may be configured with instructions to allow for, at least in part, performance of various actions of the method 900. As an example, a computer-readable medium (CRM) may be a computer-readable storage medium, which is not a carrier wave, that is not a signal and that is non-transitory.

Figure 10:
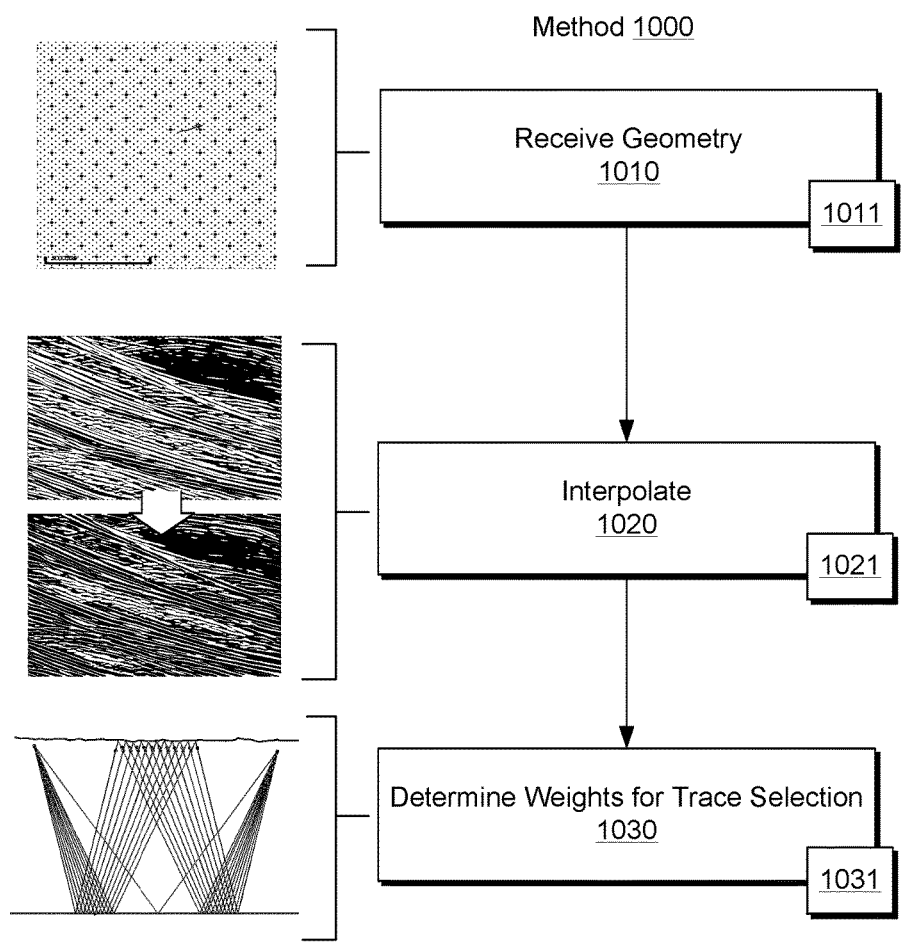
FIG. 10 illustrates an example of a method.

FIG. 10 shows an example of a method 1000 that includes a reception block 1010 for receiving a geometry, an interpolation block 1020 for interpolating data, and a weight block 1030 for weighting for selection of a trace.

In the example of FIG. 10, the reception block 1010 can include generating an areal or other desired input geometry, the interpolation block 1020 can include performing a multidimensional interpolation (e.g., 2D, 3D, 4D, 5D, etc.) and the weight block 1030 can include weighting for automatic selection of a best trace (e.g., via a GSMP approach).

The method 1000 may be associated with various computer-readable media (CRM) blocks or modules 1011, 1021 and 1031. Such blocks can include instructions suitable for execution by one or more processors (or processor cores) to instruct a computing device or system to perform one or more actions. As an example, a single medium may be configured with instructions to allow for, at least in part, performance of various actions of the method 1000. As an example, a computer-readable medium (CRM) may be a computer-readable storage medium, which is not a carrier wave, that is not a signal and that is non-transitory.

As an example, a method can include creating an areal geometry, generating a pseudo-density model that incorporates events from a seismic image, performing modeling (e.g., finite-difference method, etc.), performing windowed amplitude matching, and performing a general surface multiple prediction (GSMP) technique. As an example, a pseudo-density model may include creating random acoustic impedance via an integrated trace feature in the PETREL® framework, may include a Gardner's density (e.g., without smoothing) and/or may include a delta field (e.g., without smoothing) as a tool to fix salt density, etc.

As an example, a method may be implemented for one or more types of seismic surveys. For example, consider a marine-based survey of a region such as the Gulf of Mexico. In such an example, the survey may lack data for portions of the region, which may, for example, be filled via a method such as the method 800 of FIG. 8. In such an example, a location may be selected and a trace selected for that location where the trace may be a real data trace, an interpolated trace, a modeled trace, etc. As to a real data trace, such a trace may be from the region or, for example, from a different region. As an example, a real data trace may be a trace recorded for a survey that is of sufficient quality, for example, according to one or more criteria. As an example, where a real data trace is analyzed and deemed to be of insufficient quality, a decision may be made to select a different type of trace (e.g., a model-based trace, an interpolated trace, etc.). As an example, a different type of trace can refer to a trace for a selected location of a survey that was not recorded specifically as part of that survey.

As an example, a method can include implementing one or more portions of the OMEGA™ framework (Schlumberger Limited, Houston, Tex.). For example, consider a finite-difference feature of such a framework that can provide for two-way wavefield extrapolation modeling, generating synthetic shot gathers with and without multiples. as an example, a finite-difference method (FDM) model can generate synthetic shot gathers by using full 3D, two-way wavefield extrapolation modeling—the same wavefield extrapolation logic matches that are used by reverse-time migration (RTM). As an example, a FDM approach can model various aspects and effects of wave propagation. As an example, output from a FDM can include synthetic shot gathers containing direct arrivals, primaries, surface multiples, and/or interbed multiples. As an example, a model can be specified on a dense grid as velocity and optionally as anisotropy, dip, and variable density.

As an example, a survey design can be modeled to help to ensure a desired level of quality of a seismic survey. As an example, a model result may indicate regions that may be lacking when real data are acquired. As an example, a method can include filling in one or more regions with synthetic data and/or one or more other types of data.

As an example, a method can include implementing the GSMP feature of the OMEGA™ framework. Such a feature can provide for surface-related multiple elimination (SRME) (e.g., an attenuation of multiples technique), for example, to help predict complex multiples, including diffracted and scattered multiple energy. As an example, a GSMP approach may be implemented to address sparse, missing, irregular, inadequate quality, etc., field data. As an example, a seismic survey that can be processed using GSMP may be a wide-azimuth survey, a towed-streamer survey, etc.

As an example, a method can include implementing the matching pursuit Fourier interpolation (MPFI) feature of the OMEGA™ framework. Such a feature can provide an estimation of a Fourier spectrum of input data, for example, followed by an inverse Fourier transform to output data onto a grid.

As an example, MPFI can include interpolating beyond spatial Nyquist, for example, via estimating the Fourier spectrum using a matching pursuit. Such an approach can be iterative where, for each iteration, a discrete Fourier transform of the data is computed. In such an example, the Fourier component with maximum energy may be selected. Such a component can be added to an estimated spectrum. As an example, an inverse Fourier transform of the selected Fourier component can be computed and, for example, the selected Fourier component from the input data can be subtracted.

As an example, an interpolation technique can be multi-dimensional (e.g., optionally up to 5D (four spatial coordinates and time)). As an example, an interpolation technique may handle sparsely sampled data and steep dips and may be applied in overlapping spatial/temporal windows. As an example, an interpolation technique may uses locations of input data and may provide output that can be at one or more specified locations, either regular or irregular. As an example, an interpolation technique can aim to preserve amplitude.

Figure 11:
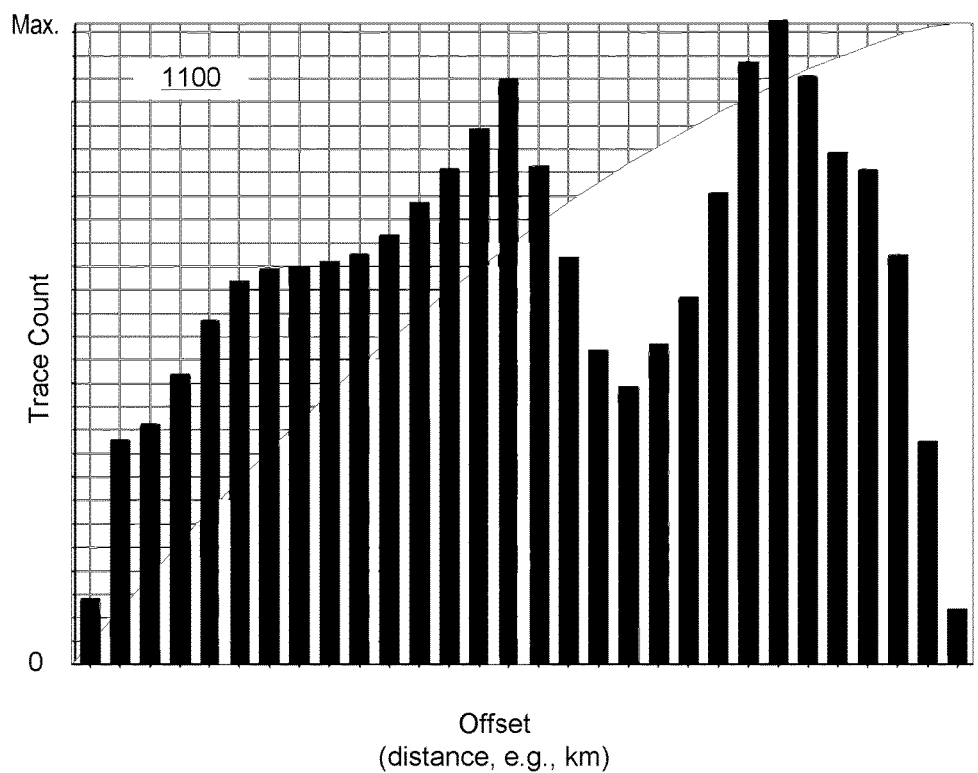
FIG. 11 illustrates an example of a plot.

FIG. 11 shows an example plot 1100 as to offset error. In the plot 1100, a curve represents an areal ("ideal") geometry and the bars represent a coil geometry, both with respect to trace count (vertical axis) and offset (horizontal axis).

As an example, a relatively uniform grid of shot and receiver positions can result in increasing fold with increased offset. As an example, a towed streamer geometry may be deficient at far offsets in comparison to a uniform grid. Such a deficiency, along with irregularity of certain geometries (e.g., coil), can help to explain azimuth deficiency of a towed streamer geometry at far offsets (e.g., for purposes of GSMP/SRME).

FIG. 12 shows example plots 1210 and 1230. In FIG. 12, the plot 1210 shows areal geometry shots (squares) and coil shots (circles) with an average coil shot spacing of about 60 meters and an areal geometry shot spacing of about 300 meters. In FIG. 12, the plot 1230 shows GSMP input error (e.g., gaps) with respect to offset (e.g., meters). As shown, GSMP error distance improves due to ideal azimuth sampling of the areal geometry per a comparison of the coil data 1232 and the coil data with areal geometry data 1234.

FIG. 13 shows example plots 1310, 1320 and 1330 for two geometries with respect to a source and a receiver (e.g., detector). The plots 1310 and 1320 pertain to local statistic while the plot 1330 pertains to global statistic with first geometry data 1332 (per the plot 1310) and second geometry data 1334 (per the plot 1320).

As an example, a GSMP approach can look for the nearest traces to a grid of downward reflection points (DRPs) to assemble a multiple contribution gather (MCG).

As an example, a GSMP approach can use a weighted geometry error to choose input traces, for example, via the following approximated equation:

$$E = \sqrt{(W_{xy}E_{xy})^2 + (W_d E_d)^2 + (W_\theta E_\theta)^2}$$

where xy refers to midpoint error, d refers to offset error, and θ refers to azimuth-offset error: azimuth error term scaled by offset.

As an example, a method can include performing an efficient on-the-fly interpolation that moves traces to desired locations. As an example, error in interpolation can increase for larger gaps. As an example, for smaller gaps, errors may effectively cancel and have little effect. As an example, larger gaps may be associated with a lower quality model.

As an example, a global statistic of GSMP error distance (see, e.g., equation above for E) can provide for quality control of size of one or more gaps on an input to a GSMP technique. As an example, comparisons may be useful in similar geology when weight terms are held fixed. In the plots 1310 and 1320, the input geometry of the plot 1320 has smaller gaps than the input geometry of the plot 1310 where, for example, the same output locations may be utilized for modeling. The plot 1330 shows a reduction in the average error distance with respect to trace offset for the geometry of the plot 1320 when compared to the geometry of the plot 1310 (see, e.g., gap reduction and gaps reduced). As an example, a method can include calculating local and/or global statistics.

Figure 14:
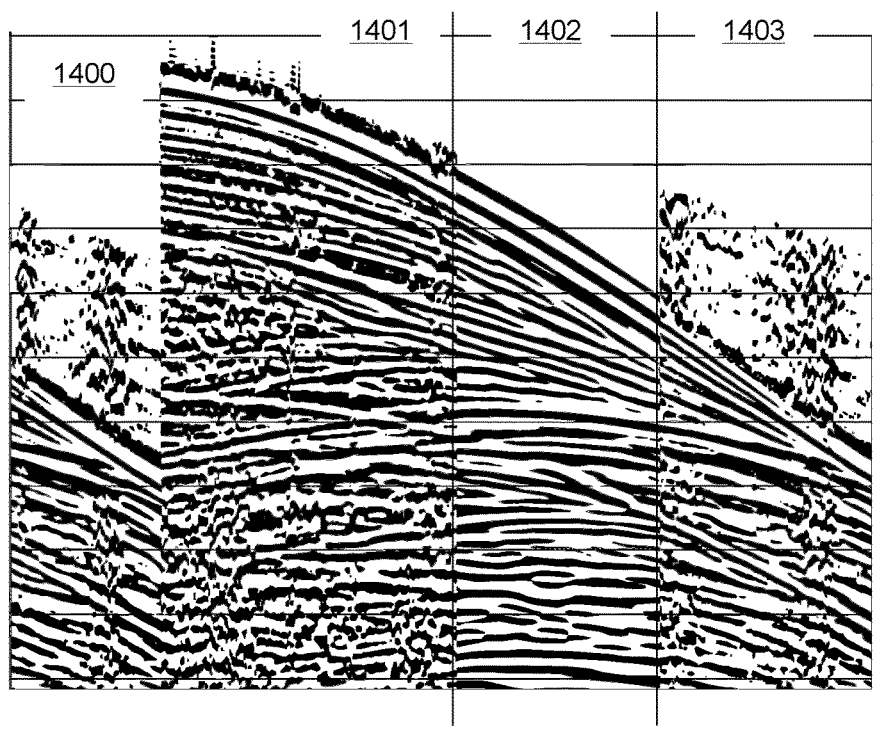
FIG. 14 illustrates an example of a plot.

FIG. 14 shows an example of a plot 1400 that includes real data 1401, model data 1402 (e.g., finite-difference method model data) and real data 1403. Such data may be provided as input to a GSMP technique.

Figure 15:
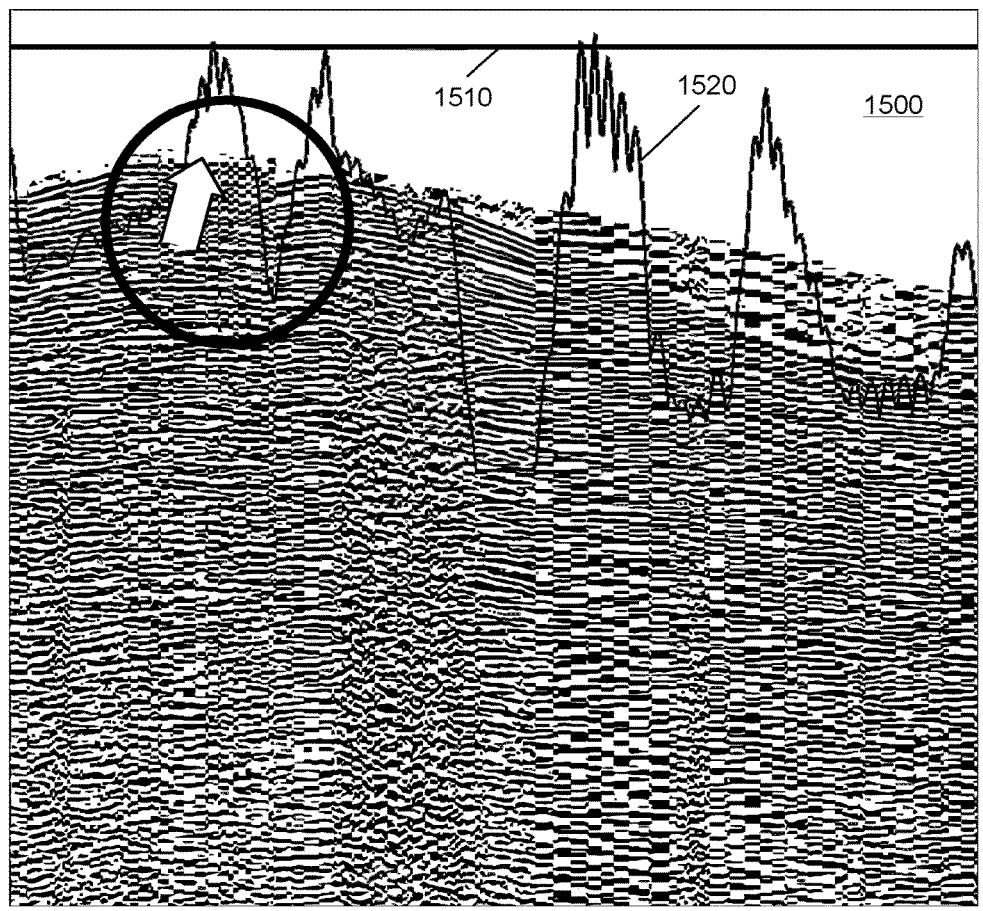
FIG. 15 illustrates an example of a plot.

FIG. 15 shows an example plot 1500 of data in an MCG domain where trace types include real data traces. A graph 1510 that spans the domain indicates that the trace types are real data traces across the domain (e.g., flat line). Another graph 1520 that spans the plot 1500 represents error distance per source-side of the domain.

Figure 16:
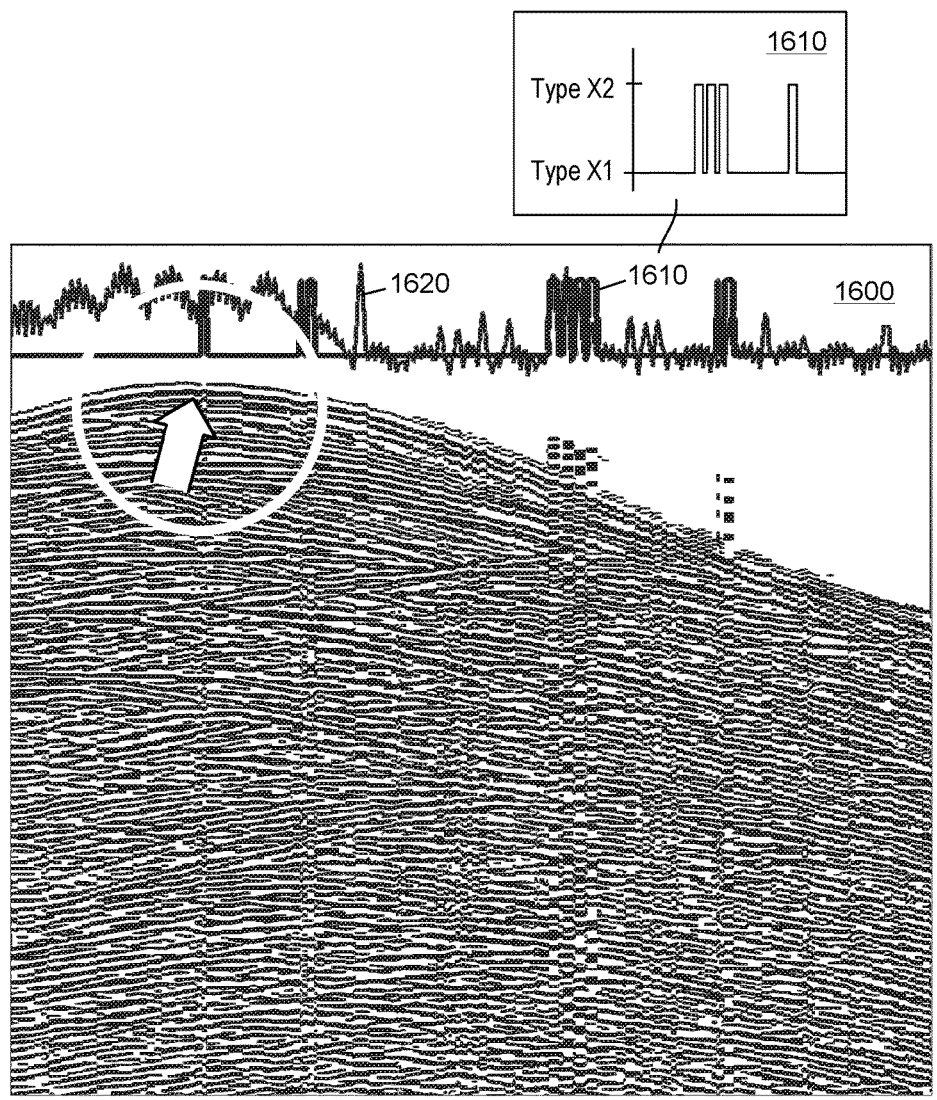
FIG. 16 illustrates an example of a plot.

FIG. 16 shows an example plot 1600 of data in an MCG domain where trace types include real data traces and synthetic data traces. A graph 1610 that spans the domain indicates that trace types include real data traces and synthetic data traces where a downward deviation indicates a location of a synthetic trace (e.g., up real and down synthetic). As an example, the graph 1610 can include multiple states such as 0, 0.5 and 1 for different types of traces or, for example, −1, 0 and +1, etc. In such an example, a user may readily discern a type of trace selected according to, for example, one or more selection criteria, which may aim to minimize error of a multiple model that can be utilized to attenuate multiple reflections in seismic data. In FIG. 16, another graph 1620 that spans the plot 1600 represents error distance. As an example, error distance may be a metric that can be utilized to assess selections, make selections, etc. As an example, a graph such as the graph 1610 may be a part of a graphical user interface where input may be received via a computing device (e.g., a touch screen display, a mouse, a track ball, a stylus, etc.) to select a trace, which may be a type of trace (see, e.g., Type X1 and Type X2). As an example, such a trace may be rendered to a display, visualized, marked for storage, revision, etc. While the example of FIG. 16 shows two types, as mentioned, a graphic and/or a graphical user interface may display one type, two types or more than two types of traces.

As shown via a comparison of FIGS. 15 and 16, continuity improves with synthetic input. As shown, timing at the arrow stays relatively consistent between real and synthetic traces, which can provide an indication of confidence to bulk timing of events. In the examples of FIGS. 15 and 16, water bottom (WB or seafloor) amplitude tends to match real but events just beneath WB tend to differ to some extent.

Figure 17:
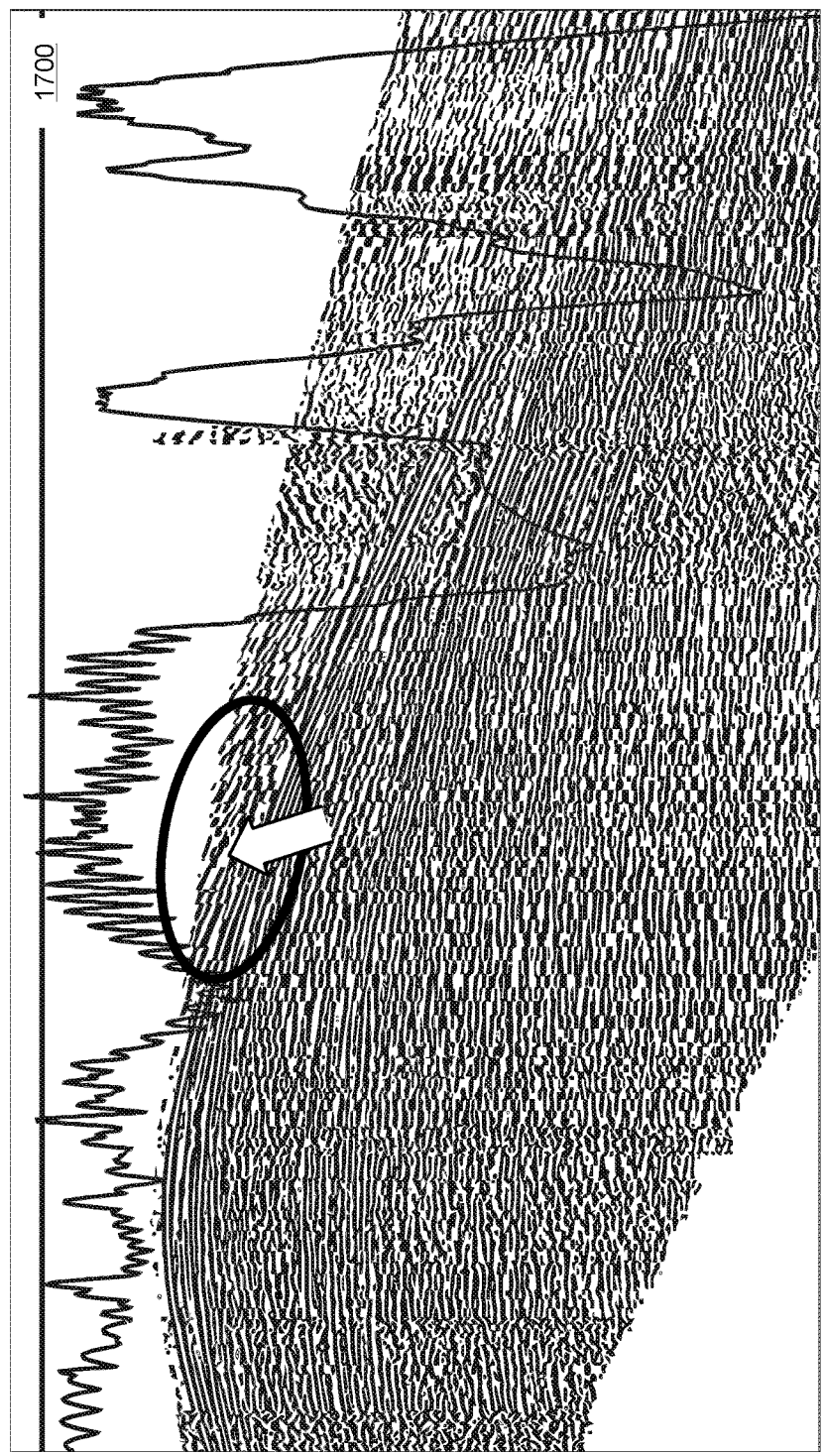
FIG. 17 illustrates an example of a plot.
Figure 18:
FIG. 18 illustrates an example of a plot.

FIGS. 17 and 18 show another set of example plots 1700 and 1800 where the plot 1700 is for real data and where the plot 1800 is for real and synthetic data. As in the plots 1500 and 1600, a graph indicates the presence of real and synthetic data across the span and another graph indicates error. In the example plots 1700 and 1800, WB matches with respect to timing and amplitude while events beneath WB tend to be low in amplitude; noting that far offset is enhanced.

Figure 19:
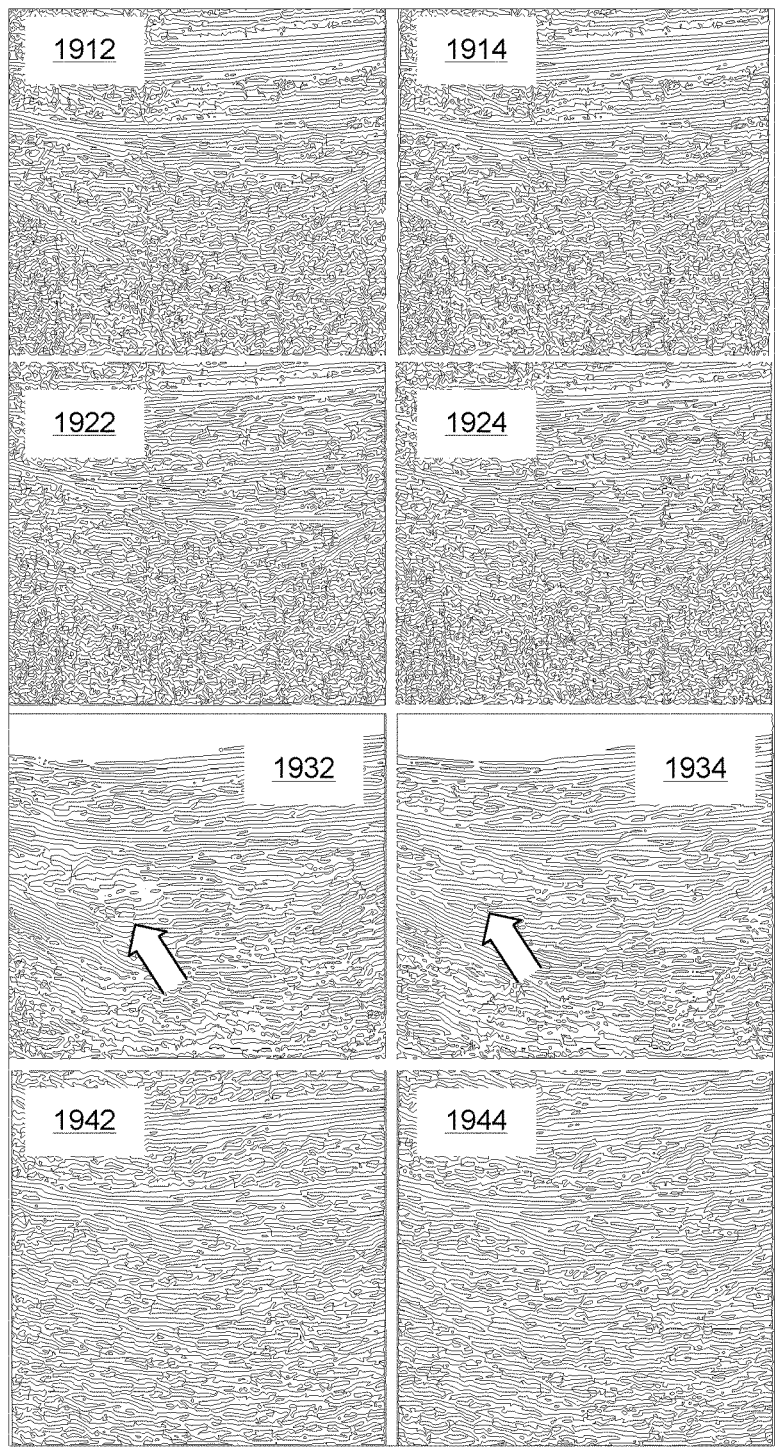
FIG. 19 illustrates examples of plots.

FIG. 19 shows a series of example plots that include shot domain plots before subtraction 1912 and 1914, shot domain plots after subtraction for real data 1922 and for real and modeled data 1924, shot domain difference plots for real data 1932 and for real and modeled data 1934, and global matched GSMP model data for GSMP input of real data alone 1942 and for GSMP input of real and modeled data 1944.

Figure 20:
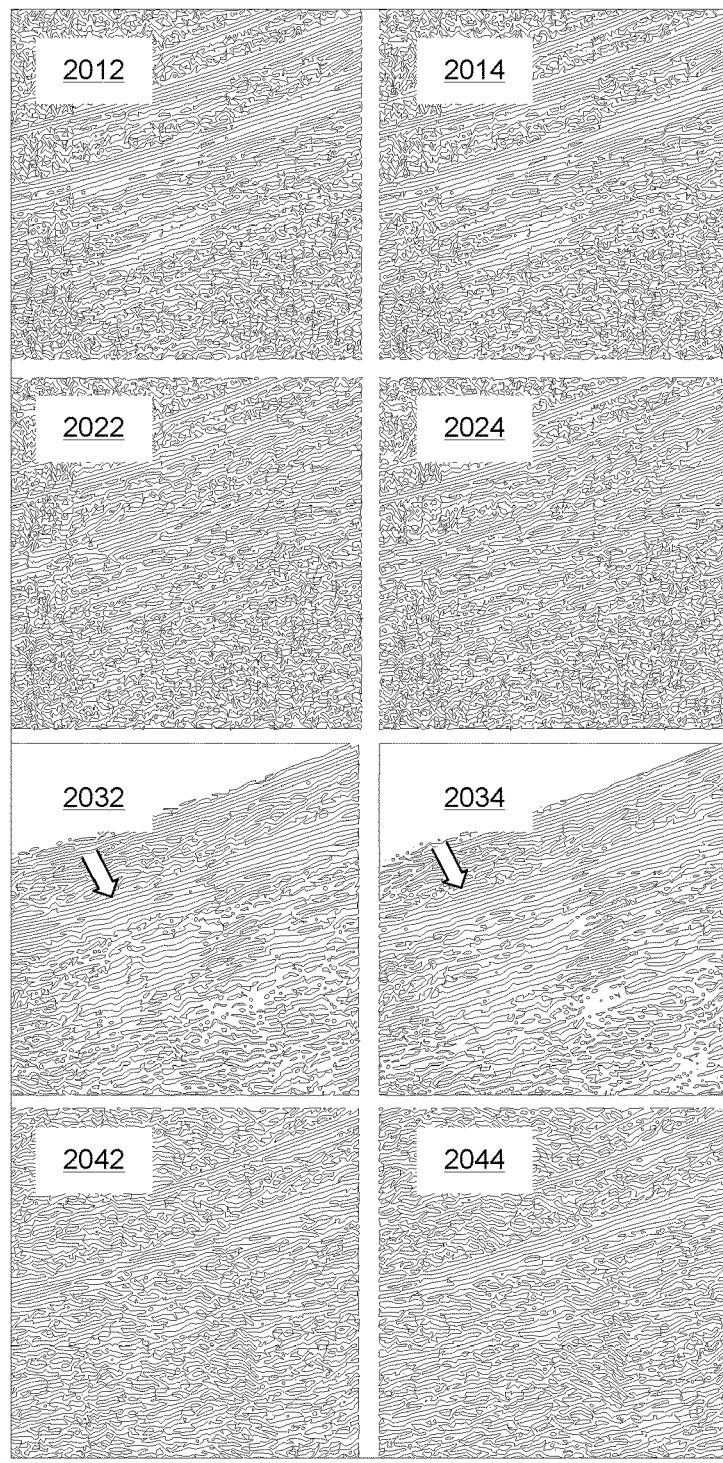
FIG. 20 illustrates examples of plots.

FIG. 20 shows a series of example plots that include shot domain plots before subtraction 2012 and 2014, shot domain plots after subtraction for real data 2022 and for real and modeled data 2024, shot domain difference plots for real data 2032 and for real and modeled data 2034, and global matched GSMP model data for GSMP input of real data alone 2042 and for GSMP input of real and modeled data 2044.

Figure 21:
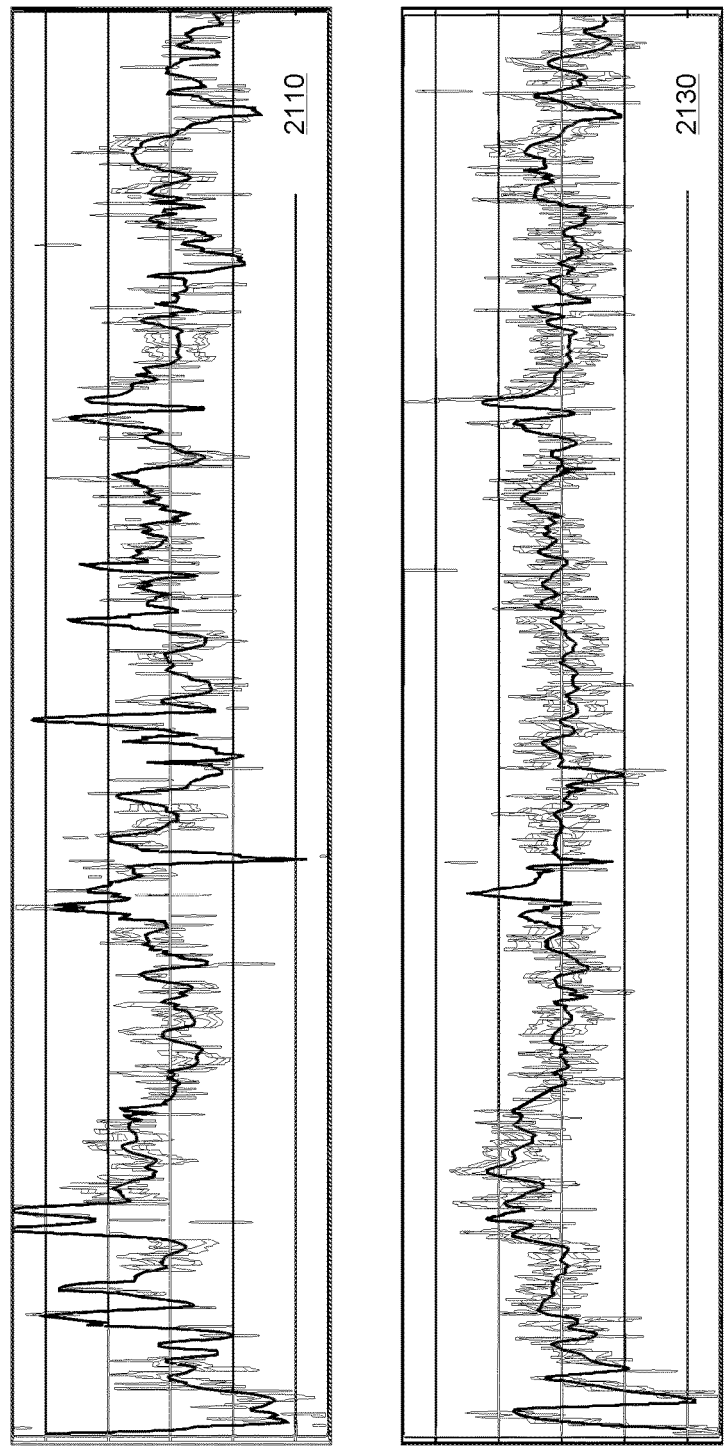
FIG. 21 illustrates examples of plots.

FIG. 21 shows example plots 2110 and 2130 that correspond to a coil model and cross-correlation of model with data for a window at a first multiple (plot 2110) and a coil-MPFI model and cross-correlation of model with data for a window at a first multiple (plot 2130). As can be seen via a comparison of the plots 2110 and 2130, the use of matching pursuit Fourier interpolation (MPFI) can enhance a process for handling multiples.

As an example, a method can include selecting a location associated with a seismic survey geometry; selecting a trace for the location where the trace is selected from one of a plurality of different types of traces that include real data traces, interpolated data traces and model data traces; generating a multiple model based at least in part on the selected trace; and adjusting seismic data based at least in part on the multiple model. In such an example, the trace can include amplitude data with respect to time.

As an example, real data traces can include seismic survey data acquired for a seismic survey geometry and/or seismic survey data acquired for a seismic survey geometry differing from the seismic survey geometry.

As an example, interpolated data traces can include multidimensional interpolated data traces based at least in part on real data traces for seismic survey data acquired for one or more seismic survey geometries.

As an example, model data traces can include finite-difference method model-based model data traces.

As an example, a method can include rendering a graphic to a display that includes an indicator as to type of trace associated with a portion of the seismic survey geometry. In such an example, the graphic can be rendered with respect to a span for downward reflection points. As an example, such a graphic can be rendered with a seismic image.

As an example, a method can include selecting a trace based on at least one selection criterion. For example, the at least one selection criterion can be associated with error minimization of a multiple model. As an example, at least one selection criterion can include at least one geometry criterion and at least one quality criterion associated with the type of trace.

As an example, a method can include repeating selecting a location and selecting a trace where generating a multiple model is based at least in part on a plurality of selected traces.

As an example, a method can include adjusting a selected trace for offset using differential normal moveout. As an example, a method can include performing a convolution operation.

As an example, a system can include a processor; memory accessible by the processor; processor-executable instructions stored in the memory to instruct the system to: select a location associated with a seismic survey geometry; select a trace for the location where the trace is selected from one of a plurality of different types of traces that include real data traces, interpolated data traces and model data traces; generate a multiple model based at least in part on the selected trace; and adjust seismic data based at least in part on the multiple model.

In such an example, the system may include a display and processor-executable instructions to render a graphic to the display that includes an indicator as to type of trace associated with a portion of the seismic survey geometry.

As an example, a system can include processor-executable instructions to select a trace based on at least one selection criterion.

As an example, one or more computer-readable storage media can include computer-executable instructions to instruct a system to: select a location associated with a seismic survey geometry; select a trace for the location where the trace is selected from one of a plurality of different types of traces that include real data traces, interpolated data traces and model data traces; generate a multiple model based at least in part on the selected trace; and adjust seismic data based at least in part on the multiple model. In such an example, computer-executable instructions can be included to instruct a system to select the trace based on at least one selection criterion.

As an example, a system may include one or more modules, which may be provided to analyze data, control a process, perform a task, perform a workstep, perform a workflow, etc.

FIG. 22 shows components of an example of a computing system 2200 and an example of a networked system 2210. The system 2200 includes one or more processors 2202, memory and/or storage components 2204, one or more input and/or output devices 2206 and a bus 2208. In an example embodiment, instructions may be stored in one or more computer-readable media (e.g., memory/storage components 2204). Such instructions may be read by one or more processors (e.g., the processor(s) 2202) via a communication bus (e.g., the bus 2208), which may be wired or wireless. The one or more processors may execute such instructions to implement (wholly or in part) one or more attributes (e.g., as part of a method). A user may view output from and interact with a process via an I/O device (e.g., the device 2206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2210. The network system 2210 includes components 2222-1, 2222-2, 2222-3, . . . 2222-N. For example, the components 2222-1 may include the processor(s) 2202 while the component(s) 2222-3 may include memory accessible by the processor(s) 2202. Further, the component(s) 2222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method of improving seismic image data processing, the method comprising:
   receiving real data traces acquired via seismic acquisition equipment according to a seismic survey geometry for a geologic region wherein each of the real data traces comprises a series of values representing seismic energy with respect to a corresponding series of times or depths and wherein real data trace coverage gaps exist within the seismic survey geometry;
   generating model data traces from a seismic image;
   selecting locations associated with the seismic survey geometry for the geologic region;

selecting a trace for each of the locations wherein each trace is selected from one of a plurality of different types of traces that comprise the real data traces, interpolated data traces and the model data traces and wherein at least one distance criterion is utilized for determining whether to select one of the interpolated data traces or one of the model data traces for one of the locations in one of the coverage gaps;

generating a multiple model using the selected traces;

adjusting seismic image data for the geologic region using the multiple model to generate improved seismic image data for the geologic region; and rendering an image of spatial relations of structures of the geologic region to a display using the improved seismic image data.

2. The method of claim 1 wherein each of the traces comprises amplitude data values with respect to time.

3. The method of claim 1 wherein the interpolated data traces comprise multidimensional interpolated data traces based at least in part on the real data traces.

4. The method of claim 1 wherein the model data traces comprise finite-difference method model-based model data traces.

5. The method of claim 1 comprising rendering a graphic to a display that comprises an indicator as to type of selected trace associated with a portion of the seismic survey geometry.

6. The method of claim 5 wherein the graphic is rendered with respect to a span for downward reflection points.

7. The method of claim 6 wherein the graphic is rendered with a seismic image.

8. The method of claim 1 wherein the selecting comprises selecting the trace based on a plurality of selection criteria.

9. The method of claim 1 wherein the selecting comprises using a selection criterion that is associated with error minimization of the multiple model.

10. The method of claim 1 wherein the selecting comprises using a selection criterion that comprises a quality criterion associated with the type of trace.

11. The method of claim 1 comprising adjusting the selected trace for offset using differential normal moveout.

12. The method of claim 1 comprising performing a convolution operation.

13. The method of claim 1 wherein the selecting comprises selecting one or more of the traces with respect to a downward reflection point of a grid of downward reflection points associated with the seismic survey geometry for the geologic region.

14. The method of claim 1 wherein the modeled data traces are generated using a depth-domain image of the real data traces and wherein events in the modeled data traces relate to events in the real data traces.

15. The method of claim 1 wherein the selecting comprises utilizing a hierarchy of real data traces followed by interpolated data traces followed by modeled traces wherein the at least one distance criterion comprises a gap size distance criterion that is utilized for the determining whether to select one of the interpolated data traces or one of the model data traces for one of the locations in one of the coverage gaps.

16. A system comprising:
a processor;
memory accessible by the processor; and
processor-executable instructions stored in the memory to instruct the system to:
receive real data traces acquired via seismic acquisition equipment according to a seismic survey geometry for a geologic region wherein each of the real data traces comprises a series of values representing seismic energy with respect to a corresponding series of times or depths and wherein real data trace coverage gaps exist within the seismic survey geometry;

generate model data traces from a seismic image;

select locations associated with the seismic survey geometry for the geologic region;

select a trace for each of the locations wherein each trace is selected from one of a plurality of different types of traces that comprise the real data traces, interpolated data traces and the model data traces and wherein at least one distance criterion is utilized for determining whether to select one of the interpolated data traces or one of the model data traces for one of the locations in one of the coverage gaps;

generate a multiple model using the selected traces;

adjust seismic image data for the geologic region using the multiple model to generate improved seismic image data for the geologic region; and render an image of spatial relations of structures of the geologic region to a display using the improved seismic image data.

17. The system of claim 16 comprising a display and processor-executable instructions to render a graphic to the display that comprises an indicator as to type of selected trace associated with a portion of the seismic survey geometry.

18. The system of claim 16 comprising processor-executable instructions to select the trace based on a plurality of selection criteria.

19. One or more non-transitory computer-readable storage media comprising computer-executable instructions to instruct a system to:
receive real data traces acquired via seismic acquisition equipment according to a seismic survey geometry for a geologic region wherein each of the real data traces comprises a series of values representing seismic energy with respect to a corresponding series of times or depths and wherein real data trace coverage gaps exist within the seismic survey geometry;

generate model data traces from a seismic image;

select locations associated with the seismic survey geometry for the geologic region;

select a trace for each of the locations wherein each trace is selected from one of a plurality of different types of traces that comprise the real data traces, interpolated data traces and the model data traces and wherein at least one distance criterion is utilized for determining whether to select one of the interpolated data traces or one of the model data traces for one of the locations in one of the coverage gaps;

generate a multiple model using the selected traces;

adjust seismic image data for the geologic region using the multiple model to generate improved seismic image data for the geologic region; and render an image of spatial relations of structures of the geologic region to a display using the improved seismic image data.

20. The one or more non-transitory computer-readable storage media of claim 19 comprising computer-executable instructions to instruct a system to: select the trace based on a plurality of selection criteria.

* * * * *